(12) United States Patent
Sakai et al.

(10) Patent No.: US 7,242,839 B2
(45) Date of Patent: Jul. 10, 2007

(54) OPTICAL DELAY ELEMENT

(75) Inventors: Atsushi Sakai, Kanagawa (JP); Ikuo Katoh, Kanagawa (JP); Hiroyoshi Funato, Kanagawa (JP); Toshihiko Baba, Tokyo (JP)

(73) Assignees: Ricoh Company, Ltd., Tokyo (JP); Toshihiko Baba, Tokyo (JP)

( * ) Notice: Subject to any disclaimer, the term of this patent is extended or adjusted under 35 U.S.C. 154(b) by 127 days.

(21) Appl. No.: 11/086,282

(22) Filed: Mar. 23, 2005

(65) Prior Publication Data

US 2006/0083472 A1    Apr. 20, 2006

(30) Foreign Application Priority Data

Mar. 24, 2004 (JP) ............................. 2004-086389

(51) Int. Cl.
    *G02B 6/10* (2006.01)
(52) U.S. Cl. ......................................... 385/129; 385/27
(58) Field of Classification Search ................ 385/27, 385/129, 132
    See application file for complete search history.

(56) References Cited

U.S. PATENT DOCUMENTS

| 5,333,231 | A | 7/1994 | Fukuda et al. ............... 385/122 |
| 5,481,636 | A | 1/1996 | Fukuda et al. ............... 385/122 |
| 6,542,682 | B2* | 4/2003 | Cotteverte et al. .......... 385/125 |
| 6,631,236 | B2* | 10/2003 | Yamada ....................... 385/129 |
| 6,870,970 | B2* | 3/2005 | Leonard et al. ................ 385/5 |
| 6,937,781 | B2* | 8/2005 | Shirane et al. ................. 385/16 |
| 7,162,132 | B2* | 1/2007 | Parker et al. ................. 385/129 |
| 2002/0118941 | A1* | 8/2002 | Notomi et al. ............... 385/129 |
| 2002/0191933 | A1* | 12/2002 | Tokushima .................. 385/129 |
| 2003/0068152 | A1* | 4/2003 | Gunn .......................... 385/129 |
| 2004/0001683 | A1* | 1/2004 | Lau et al. .................... 385/129 |
| 2006/0251368 | A1* | 11/2006 | Kittaka et al. ............... 385/125 |

FOREIGN PATENT DOCUMENTS

| JP | 2002-333536 | 11/2002 |
| JP | 2003-156642 | 5/2003 |

OTHER PUBLICATIONS

Takashi Sato, et al., "In-Plane Light Propagation in $Ta_2O_5/SiO_2$ Autocloned Photonic Crystals", IEEE Journal of Quantum Electronics, vol. 38, No. 7, Jul. 2002, pp. 904-908.

(Continued)

*Primary Examiner*—Sung Pak
*Assistant Examiner*—Daniel Petkovsek
(74) *Attorney, Agent, or Firm*—Oblon, Spivak, McClelland, Maier & Neustadt, P.C.

(57) ABSTRACT

An optical delay element including a photonic crystal line defect optical waveguide is disclosed that has a large group refractive index and has small or nearly constant wavelength dispersion of the group refractive index in a wide wavelength region for practical use. The optical delay element includes a line defect optical waveguide formed in a photonic crystal structure, and the volume of the line defect optical waveguide is less than the volume of a single line defect optical waveguide. Thereby, the waveguide band of the line defect optical waveguide has two zero points in the third order dispersion curve of the line defect optical waveguide, and the sign of the third order dispersion curve is inverted near the zero points. Therefore, the waveguide band of the line defect optical waveguide is modified, and this enables expansion of the wavelength region having a large group refractive index, small wavelength dispersion of the group refractive index, and small wavelength dispersion of the speed of optical pulses.

19 Claims, 16 Drawing Sheets

OTHER PUBLICATIONS

M. Notomi, et al., "Extremely Large Group-Velocity Dispersion of Line-Defect Waveguides in Photonic Crystal Slabs", Physical Review Letters, vol. 87, No. 25, Dec. 17, 2001, pp. 253902-1-253092-4.

Dispersion-Controlled Optical Group Delay Device by Chirped Photonic Crystal Waveguides, Applied Physics Letters, vol. 85, No. 7, Aug. 16, 2004, Daisuke Mori and Toshihiko Baba, Department of Electrical and Computer Engineering, Yokohama National University, 79-5 Tokiwadai, Hodogayaku, Yokohama 240-8501, Japan.

Extended Abstracts (The 50th Spring Meeting 2003); The Japan Society of Applied Physics an Related Societies No. 3, p. 1130, 28p-YN-1, JSAP Catalog No.: AP 031110-03, 2003, (Mar. 2003).

Extended Abstracts (The 64th Autumn Meeting 2003); The Japan Society of Applied Physics No. 3, p. 947, 1p-ZM-14, JSAP Catalog No.: AP 031129-03, Aug. 2003.

* cited by examiner

WAVE NUMBER SPACE

STRENGTH OF ELECTROMAGNETIC FIELD OF LIGHT

OPTICAL DELAY ELEMENT

BACKGROUND OF THE INVENTION

1. Field of the Invention

The present invention relates to an optical delay element using a photonic crystal.

2. Description of the Related Art

One of the subjects in optical communication is to provide an optical switching system able to change optical paths without opto-electric conversion of optical signals when transmitting optical packet data. In the related art, however, the optical signals have to be completely converted to electrical signals first, and then after the transmission paths are determined (changed) in form of electrical signals, the electrical signals are converted to optical signals again by electric-opto conversion.

In order to transmit optical signals themselves, it is necessary to use a switching element for changing the polarization direction of the light beam being transmitted, and an element for analyzing the polarization direction of the light beam. In addition, in an optical packet, a header containing path information may be appended prior to a section of actual information to sort the optical information. At least in principle, all these operations can be carried out by light, but the problem that should be solved is the switching element. Alternatively, it is also conceivable to change paths electrically, and change the optical paths without opto-electric conversion.

In order to conduct optical packet communications, fast optical path converting switches, wavelength converting elements, and optical delay elements are required. The optical delay elements serve to compensate for various signal delays required in path switching of optical signals. For example, background art of this technical field is disclosed in Japanese Laid-Open Patent Application No. 2003-156642 (referred to as "reference 1" hereinafter), Japanese Laid-Open Patent Application No. 2002-333536 (referred to as "reference 2" hereinafter), and Physical Review Letters Vol. 87, 253902 (2001) (referred to as "reference 3" hereinafter).

The current situations of these optical elements are described below.

First, as for the fast optical path converting switches, a switch operating at pico-second level is obtainable by applying an electric field to an optical waveguide switch which is constructed by combining optical modulation elements made of electrical-optical materials or semiconductor materials possessing a quantum-well structure. In addition, switches made of non-linear materials for optically switching optical paths are also proposed and being studied.

Concerning the wavelength converting elements, it is found that wavelength conversion can be implemented by making use of harmonic component generation phenomenon generated by non-linear materials, and research and development in this subject are being made.

As for the optical delay elements, in order to implement an optical delay element, a scheme as described below is adopted presently, in which an optical fiber of super-low loss is used to generate delay of optical pulses.

However, in this scheme, in order to delay the optical pulses by 1 ns, a quite long optical fiber has to be used, for example, for an optical fiber having a refractive index of 1.5, the required length is 20 cm to generate a delay of 1 ns. Additionally, when transmitting single wavelength optical signals, a number of optical fibers equaling the number of transmission channels have to be prepared. For these reasons, the optical device requires large size, and it is difficult to make the optical device compact.

The following solutions to this problem are proposed. First, in principle, because it is in the optical path that delay of the optical pulses occurs, if the refractive index of the transmission path is increased, the size of the transmission path can be reduced accordingly. Here, the refractive index of the transmission path is determined by a so-called "group refractive index", which influences the optical pulses. For example, when the group refractive index is 10, corresponding length of the optical delay element is 3 cm, and when the group refractive index is 30, the length of the optical delay element can be reduced to 1 cm, so that the device is greatly reduced in size. This greatly contributes to realization of multi-channel optical packet communications.

Generally, the refractive index of a material is equal to the group refractive index, but they may differ from each other for some special materials or special structures.

Materials producing a very large group refractive index on optical pulses at low loss are still not found so far. Meanwhile, it is well known that when optical pulses are transmitted in an optical waveguide of a multiple reflection structure, the optical pulses have a large group refractive index. Especially, it is reported recently that when the optical pulses are transmitted in an optical waveguide constructed by using a so-called photonic crystal, which has a dielectric periodic structure, a large group refractive index as great as 50 is observed. For example, this phenomenon is reported in the aforesaid reference 3.

In the photonic crystal, a dielectric periodical structure is formed artificially at the level of the period of light, thus forming a band structure for photons. This structure is analogous with the band structure for electrons in many aspects, specifically, a so-called "photonic bandgap" is formed because of the periodic structure in the photonic crystal, which is a forbidden band of photons. Because of strong optical confinement effect and extraordinary dispersion effect, the photonic crystal has various characteristics, which are not attainable by usual optical delay elements. Therefore, it is expected that optical devices constructed using the photonic crystal will be essential devices in constructing photonic ICs having sizes much smaller compared to the present optical integrated circuits.

Although it is ideal that the photonic crystal be constructed to have a three dimensional structure, the characteristics of the photonic crystal can also be obtained with a two-dimensional photonic crystal formed in a plane at one time by using semiconductor process techniques. Such a two-dimensional photonic crystal can be formed in the following way. That is, a thin film of a high dielectric constant is sandwiched with a material of a low dielectric constant or a film of a high reflection rate, such as a metal film, thereby, realizing light confinement, and a photonic crystal structure is formed from holes or pillars in the thin film. Such a structure can be constructed by an in-plane fine processing technique; thus, the two-dimensional photonic crystal can be fabricated by using semiconductor chip process techniques.

A two-dimensional photonic crystal formed by arranging a thin film having a large refractive index on a substrate having a small refractive index is called a "two-dimensional photonic crystal slab", and it is expected that the two-dimensional photonic crystal slab will be able to show satisfactory characteristics of the photonic crystal if the ratio of the refractive index n1 of the thin film to the refractive index n2 of the substrate is not less than or equal to 2 (that is, n2/n1>2). As examples of the two-dimensional photonic crystal slab, there is an air-bridge structure in which holes constituting a photonic crystal arrangement are formed in a thin film having a large refractive index (n>2), and the thin film is suspended in the air. In addition, the photonic crystal structure can also be formed on a substrate, which is constructed by arranging a semiconductor thin film (n=3 to 3.5) on a $SiO_2$ substrate having a relatively small refractive index (n=1.5).

In these years, an SOI (silicon-on-insulator) substrate is used to improve performance of electronic devices. The SOI substrate is constructed by arranging a silicon thin film (n is approximately 3.5) on an $SiO_2$ substrate, which is an insulator. In other words, the SOI substrate is highly suitable for fabricating the aforesaid two-dimensional photonic crystal slab, and is widely used in studies of the two-dimensional photonic crystal slab. For example, it is reported that a sharply bent optical waveguide has been fabricated with the SOI substrate.

Concerning the photonic crystal used as optical paths, a line defect optical waveguide is reported, in which a portion of the photonic crystal structure is removed. It is reported, in papers and in other ways, that a sharp bend and enhancement of the group refractive index are obtainable with the line defect optical waveguide made from the photonic crystal slab.

The line defect optical waveguide is characterized in that a large group refractive index and large wavelength dispersion of the group refractive index are obtainable at the same time. Making use of the large wavelength dispersion, it is easy to construct a dispersion compensation structure.

When using the line defect optical waveguide to delay optical pulses, however, if the wavelength dispersion of the group refractive index is too large, the refractive index varies even when the wavelength changes slightly, and this line defect optical waveguide is not suitable for use as an optical element.

In other words, when using the line defect optical waveguide to construct the optical delay element, it is required that the group refractive index be sufficiently large, but the wavelength dispersion of the group refractive index be approximately constant in a band of practical use, and it is preferable that the band for practical use be as wide as possible.

The aforesaid reference 1 discloses an invention in which the width of the line defect optical waveguide is narrowed, but this invention is devised to reduce the group refractive index, hence it is not applicable to an optical delay element.

SUMMARY OF THE INVENTION

It is a general object of the present invention to solve one or more problems of the related art.

A specific object of the present invention is to provide an optical delay element including a photonic crystal line defect optical waveguide, which has a large group refractive index, and has small or nearly constant wavelength dispersion of the group refractive index in a wide wavelength region for practical use.

According to a first aspect of the present invention, there is provided an optical delay element comprising a line defect optical waveguide formed in a photonic crystal structure, a volume of the line defect optical waveguide being different from a volume of another line defect optical waveguide formed from a single line defect photonic crystal, a waveguide band of said line defect optical waveguide having a refractive index confinement mode and a photonic bandgap confinement mode, and the line defect optical waveguide guiding light of a frequency higher than a frequency corresponding to the photonic bandgap confinement mode.

According to a second aspect of the present invention, there is provided an optical delay element comprising a line defect optical waveguide formed in a photonic crystal structure, a volume of the line defect optical waveguide being less than a volume of another line defect optical waveguide formed from a single line defect photonic crystal, a waveguide band of said line defect optical waveguide having a refractive index confinement mode and a photonic bandgap confinement mode, and the line defect optical waveguide guiding light of a frequency higher than a frequency corresponding to the photonic bandgap confinement mode.

According to a third aspect of the present invention, there is provided an optical delay element comprising a line defect optical waveguide formed in a photonic crystal structure, a refractive index of the line defect optical waveguide being different from a refractive index of the photonic crystal structure portion, a waveguide band of said line defect optical waveguide having a refractive index confinement mode and a photonic bandgap confinement mode, and the line defect optical waveguide guiding light having a frequency higher than a frequency corresponding to the photonic bandgap confinement portion of the waveguide band.

According to a fourth aspect of the present invention, there is provided an optical delay element comprising a line defect optical waveguide formed in a photonic crystal structure, a structure different from the photonic crystal structure being provided near the line defect optical waveguide, a waveguide band of said line defect optical waveguide having a refractive index confinement mode and a photonic bandgap confinement mode, and the line defect optical waveguide guiding light having a frequency higher than a frequency corresponding to the photonic bandgap confinement portion of the waveguide band.

According to a fifth aspect of the present invention, there is provided an optical delay element comprising a line defect optical waveguide formed in a photonic crystal structure, a volume of the line defect optical waveguide being different from a volume of another line defect optical waveguide formed from a single line defect photonic crystal, a waveguide band of the line defect optical waveguide having a first zero point and a second zero point in a third order dispersion curve of the line defect optical waveguide, a sign of the third order dispersion curve being inverted near the first zero point and the second zero point, the first zero point corresponding to a first frequency, and the second zero corresponding to a second frequency lower than the first frequency, and the line defect optical waveguide guiding light having a frequency near the second frequency.

As an embodiment, the line defect optical waveguide guides light having a frequency near the first frequency or the second frequency and lower than the first frequency. Further, the waveguide band has a refractive index confinement mode and a photonic bandgap confinement mode; and the line defect optical waveguide guides light having a frequency higher than a frequency corresponding to the photonic bandgap confinement mode.

According to a sixth aspect of the present invention, there is provided an optical delay element comprising a line defect optical waveguide formed in a photonic crystal structure, a volume of the line defect optical waveguide being less than a volume of another line defect optical waveguide formed from a single line defect photonic crystal, a waveguide band of the line defect optical waveguide having a first zero point and a second zero point in a third order dispersion curve of the line defect optical waveguide, a sign of the third order dispersion curve being inverted near the first zero point and the second zero point, the first zero point corresponding to a first frequency, and the second zero corresponding to a second frequency lower than the first frequency, the line defect optical waveguide guiding light having a frequency near the second frequency.

According to a seventh aspect of the present invention, there is provided an optical delay element comprising a line defect optical waveguide formed in a photonic crystal structure, a refractive index of the line defect optical waveguide being different from a refractive index of the photonic crystal structure portion, a waveguide band of the line defect optical waveguide having a first zero point and a second zero point in a third order dispersion curve of the line defect optical waveguide, a sign of the third order dispersion curve being inverted near the first zero point and the second zero point, the first zero point corresponding to a first frequency, and the second zero corresponding to a second frequency lower than the first frequency, and the line defect optical waveguide guiding light having a frequency near the second frequency.

According to an eighth aspect of the present invention, there is provided an optical delay element comprising a line defect optical waveguide formed in a photonic crystal structure, a structure different from the photonic crystal structure being provided near the line defect optical waveguide, a waveguide band of the line defect optical waveguide having a first zero point and a second zero point in a third order dispersion curve of the line defect optical waveguide, a sign of the third order dispersion curve being inverted near the first zero point and the second zero point, the first zero point corresponding to a first frequency, the second zero corresponding to a second frequency lower than the first frequency, and the line defect optical waveguide guiding light having a frequency near the second frequency.

As an embodiment, a waveguide band of the line defect optical waveguide has a first zero point and a second zero point in a third order dispersion curve of the line defect optical waveguide, a sign of the third order dispersion curve is inverted near the first zero point and the second zero point, the first zero point corresponding to a first frequency, and the second zero corresponding to a second frequency lower than the first frequency; and the line defect optical waveguide guides light having a frequency near the first frequency or the second frequency and lower than the first frequency.

As an embodiment, a portion of the line defect optical waveguide has a varying refractive index. In the embodiment, the refractive index of the line defect optical waveguide varies in response to electric field application. Alternatively, the refractive index of the line defect optical waveguide varies in response to light irradiation, or, the refractive index of the line defect optical waveguide varies in response to a temperature change.

As an embodiment, the line defect optical waveguide is formed from an electro-optical material. Alternatively, the line defect optical waveguide is formed from a non-linear optical material.

As an embodiment, the line defect optical waveguide is a photonic crystal slab line defect optical waveguide formed by arranging a two-dimensional photonic crystal structure on a thin film having a thickness approximately equaling a wavelength of the light.

In the embodiment, a width of the line defect optical waveguide is varied by moving the photonic crystal structures on two sides of the line defect optical waveguide.

In the embodiment, a thickness of the photonic crystal slab line defect optical waveguide is different from a photonic crystal slab constituting the photonic crystal structure.

In the embodiment, a refractive index of the line defect optical waveguide is different from a refractive index of the photonic crystal structure portion.

In the embodiment, a portion of the line defect optical waveguide has a varying refractive index.

In the embodiment, each of an upper cladding portion and a lower cladding portion of the line defect optical waveguide has a refractive index greater than a refractive index of the photonic crystal structure portion.

In the embodiment, the two-dimensional photonic crystal structure is formed on a thin semiconductor substrate, or the two-dimensional photonic crystal structure is formed on a SOI (silicon-on-insulator) substrate, or the two-dimensional photonic crystal structure is formed on a thin substrate made of an electro-optical material, or the two-dimensional photonic crystal structure is formed on a thin substrate made of a non-linear optical material, or the two-dimensional photonic crystal structure is formed on a composite substrate made of a thin semiconductor film, a thin film made of an electro-optical material or a non-linear optical material.

Summarizing effects of the present invention, in a line defect optical waveguide of the related art, the third order dispersion curve is a monotonic function and has no extreme, and in a coupled defect optical waveguide of the related art, although zero points exist in the third order dispersion curve, the sign of the third order dispersion curve does not change. According to the present invention, in the line defect optical waveguide formed in a photonic crystal structure, zero points exist in the third order dispersion curve of the waveguide band of the line defect optical waveguide, and near the zero points, the sign of the dispersion changes. Therefore, the waveguide band of the line defect optical waveguide can be changed by reducing the volume of the line defect optical waveguide, or by setting the refractive index of the line defect optical waveguide different from the refractive index of the photonic crystal structure portion, or by arranging an additional structure near the line defect optical waveguide, and as a result, the group refractive index obtainable with the line defect optical waveguide can be increased with dispersion remaining at a low level, and this can enlarge the wavelength region in which the wavelength dispersion of the group refractive index is small. Hence, it is possible to provide an optical delay element including a line defect optical waveguide formed in a photonic crystal structure, which has a group refractive index sufficiently greater than the refractive index of the constituent materials, and has approximately constant or small wavelength dispersion of the group refractive index in a wavelength region for practical use.

Consequently, by using the optical delay element of the present invention, it is possible to obtain a compact optical delay element, which is not attained in the related art, and it is possible to construct an optical pulse delay element able to actively control these optical elements by changing the refractive index. This invention is preferable applicable to an optical routing apparatus, or an optical information processing device.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

In the following, for descriptive purposes, it is assumed that the optical delay element of the present invention is basically formed from a two-dimensional photonic crystal slab. Of course, the present invention is also applicable to a three-dimensional photonic crystal structure.

The two-dimensional photonic crystal slab is used as an example for descriptions to also cover the three-dimensional photonic crystal structure, because the fundamental portion of a three-dimensional photonic crystal structure, or a pseudo-three-dimensional photonic crystal structure, in which a two-dimensional photonic crystal slab is sandwiched by separately-fabricated reflection structures on the upper and lower sides, is the same as that of the two-dimensional photonic crystal slab.

First Embodiment

Figure 1:
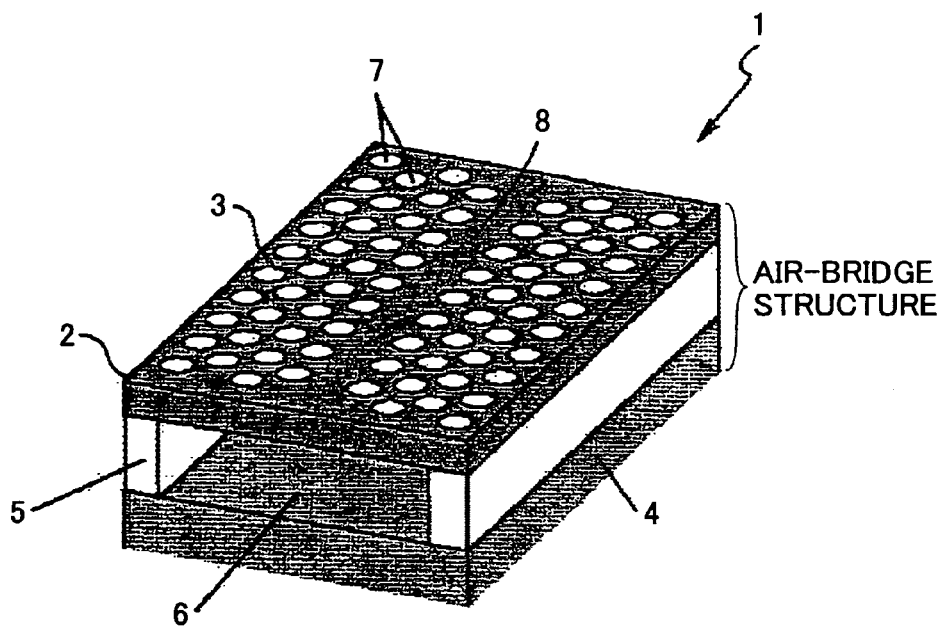
FIG. 1 is a perspective view for schematically illustrating an optical delay element 1 according to a first embodiment of the present invention, which includes a line defect optical waveguide formed from a two-dimensional photonic crystal slab.

FIG. 1 is a perspective view for schematically illustrating an optical delay element 1 according to a first embodiment of the present invention, which includes a line defect optical waveguide formed from a two-dimensional photonic crystal slab.

Figure 2:
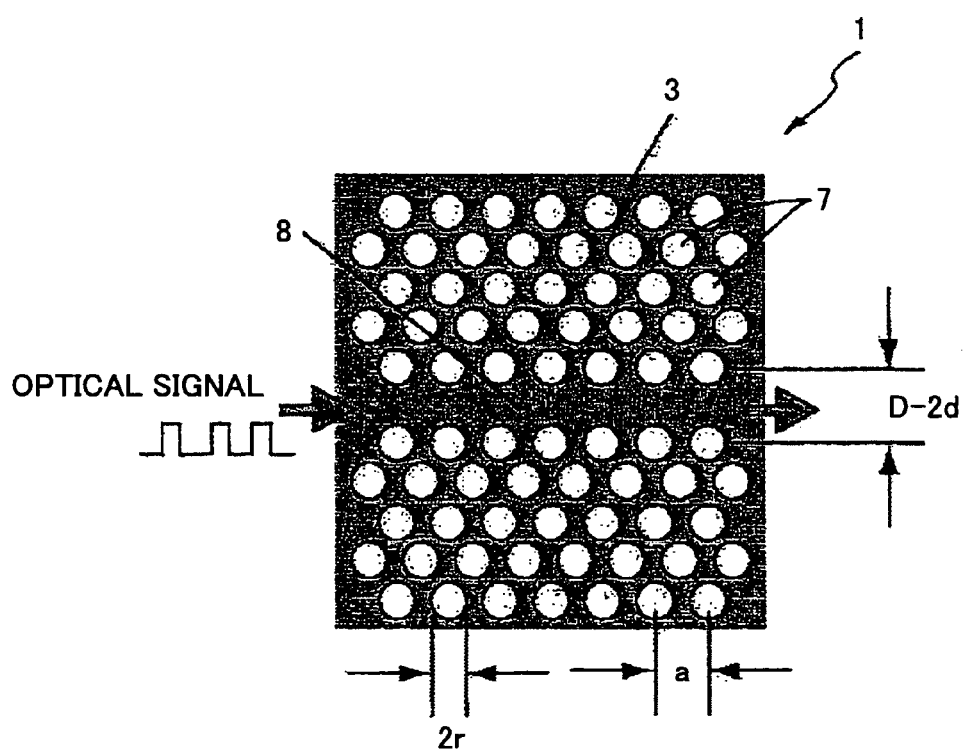
FIG. 2 is a plan view of the optical delay element 1 in FIG. 1.

FIG. 2 is a plan view of the optical delay element 1 in FIG. 1.

As illustrated in FIG. 1, the optical delay element 1 includes a substrate 4, pedestals 5 standing on the substrate 4, a high refractive index thin film 2 arranged on the pedestals 5, a cladding portion 6, which is actually an air space, and a photonic crystal structure 3 formed in the high refractive index thin film 2. For example, the thickness of the high refractive index thin film 2 is less than 1 μm. The photonic crystal structure 3 includes holes 7 filled with air. Because the cladding portion 6 is an air space, the structure of the optical delay element 1 is called an "air-bridge structure".

If the refractive index of the high refractive index thin film 2 is adequately different from the refractive index of the cladding portion 6, and the photonic crystal characteristics are attainable, it is not necessary to use the air cladding portion 6; for example, other materials having low refractive indexes may be disposed over and under the high refractive index thin film 2, or light confinement structures may be formed over or under the cladding portion 6.

In FIG. 1, it is illustrated that the holes 7 are filled with air. Of course, the holes 7 may be filled with other materials having low refractive indexes.

As it is illustrated in FIG. 1, the array of the holes 7 includes many equal triangular sub-sets. In a structure including holes formed in a high refractive index medium, such a triangular lattice structure is frequently used so as to relatively easily induce light confinement in the up-down direction by total reflection due to the present setting of the refractive indexes. Of course, a pillar type photonic crystal may be adopted as long as light confinement in the up-down direction is attainable.

In FIG. 1 and FIG. 2, it is illustrated that the each hole 7 has a circular shape. Certainly, depending on applications, each hole 7 may have a polygonal shape with the holes 7 being arranged periodically. The periodicity is attainable with a triangular lattice, a square matrix, a honeycomb arrangement, or others. It should be noted that it is not required that the holes 7 be arranged periodically. As long as characteristics of the photonic crystal or close to the photonic crystal are attainable, the holes 7 may be arranged in other manners.

The thickness of the high refractive index thin film 2 is set such that when light confinement occurs due to total reflection, the optical delay element 1 operates nearly in a single mode in the up-down direction. For example, when the high refractive index thin film 2 is a semiconductor having a refractive index near three, the thickness of the high refractive index thin film 2 may be set to be less than or equal to 0.4 μm, preferably, less than or equal to 0.2 μm. When the refractive index of the high refractive index thin film 2 is approximately two, the thickness of the high refractive index thin film 2 may be set to be less than or equal to 0.6 μm, preferably, less than or equal to 0.4 μm. If the high refractive index thin film 2 is too thin, the equivalent refractive index of the high refractive index thin film 2 decreases, and as a result, it is difficult to attain the photonic crystal characteristics. Hence, it is necessary for the high refractive index thin film 2 to be sufficiently thick while essentially maintaining the single mode in the up-down direction.

It the following descriptions, it is assumed that the holes 7 are filled with air and arranged in a manner of a triangular lattice structure, and the optical delay element 1 basically has the air-bridge structure, in which an air space is below the photonic crystal portion.

In the present embodiment, the refractive index of the high refractive index thin film 2 may be set high to be approximately three, or set to be a medium value near two. These two cases are described below.

As illustrated in FIG. 2, the air holes 7 each having a diameter of 2r in a triangular lattice pattern are arranged in the photonic crystal structure 3, and a single-line portion of the photonic crystal structure 3 is removed, forming a line defect optical waveguide 8 in the photonic crystal structure 3. This defect portion is able to guide light, hence serves as a transmission path of optical signals.

Pitches of the air holes 7 in the photonic crystal structure 3 are denoted as "a", and the width of the removed single-line portion is denoted as "D". In a common line defect optical waveguide, the width D and the pitch a satisfy the relation: $D=(\sqrt{3})a$. In the present embodiment, the width of the line defect optical waveguide 8 is reduced in order to control dispersion of a group speed.

First, descriptions are made of a photonic bandgap assuming the equivalent refractive index of the high refractive index thin film 2 is approximately three.

Figure 3A:
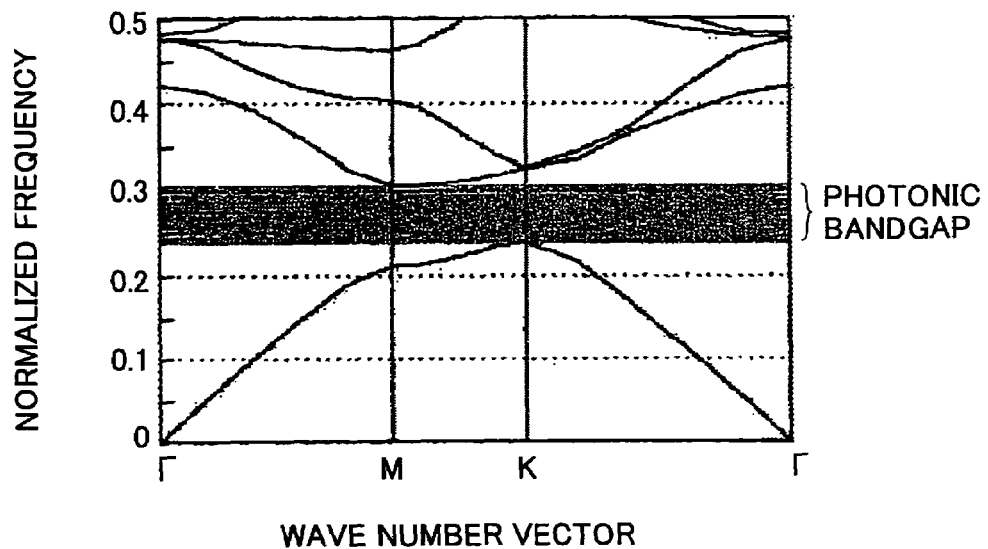
FIG. 3A shows a photonic band diagram of the photonic crystal structure 3 but without the line defect optical waveguide 8.

FIG. 3A shows a photonic band diagram of the photonic crystal structure 3 but without the line defect optical waveguide 8. In FIG. 3A, the abscissa represents a wave number vector, and quantities Γ, K and M are illustrated in FIG. 3C; the ordinate represents a normalized frequency.

The photonic band diagram shown in FIG. 3A is obtained by calculations, in which a three-dimensional shape is approximated into a two-dimensional shape by an equivalent refractive index approximation, and the three-dimensional shape is analyzed by means of two-dimensional plane wave expansion.

When the high refractive index thin film 2 is a semiconductor such as silicon, the equivalent refractive index of the high refractive index thin film 2 is approximately three. Shown in FIG. 3A is the photonic band diagram of the photonic crystal structure 3 (but without the line defect optical waveguide 8) in which the air holes 7 (refractive index equals 1) are arranged in a manner of the triangular lattice in a substrate having a refractive index near three.

Figure 3B:
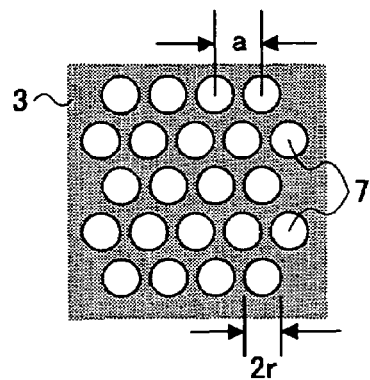
FIG. 3B and FIG. 3C are views illustrating the periodic arrangement of the photonic crystal structure shown in FIG. 3A.
Figure 3C:
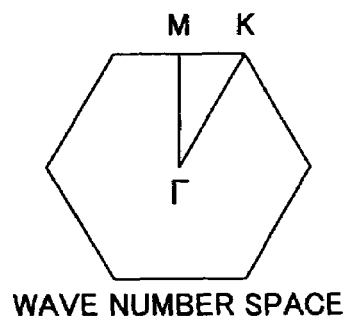

FIG. 3B and FIG. 3C are views illustrating the periodic arrangement of the photonic crystal structure shown in FIG. 3A. Specifically, FIG. 3B shows the pitches and diameters of the air holes 7 in the real space, and FIG. 3C shows the relation corresponding to the periodical structure in FIG. 3B in the wave number space (Brillouin zone).

As illustrated in FIG. 3B, when the pitches of the air holes 7 are "a", the diameter 2r of each air hole 7 is set to be 0.6 a (2r=0.6 a).

The wave number vectors Γ, K and M indicated in FIG. 3A are illustrated in a Brillouin zone in FIG. 3C.

The normalized frequency shown in FIG. 3A is a dimensionless quantity in units of $\omega a/2\pi c0$. Here, ω represents the angular frequency ω of the light, c0 represents the light speed in a vacuum.

In FIG. 3A, the photonic band corresponds to the transverse electric (TE) mode, that is, only the magnetic component in the perpendicular direction exists.

From the photonic band diagram in FIG. 3A, it is found that there exists a photonic bandgap, which is indicated by meshes in FIG. 3A. Here, a photonic bandgap is a forbidden band of photons, that is, in he photonic crystal, transmission of frequency components of light in the corresponding frequencies is forbidden.

In the calculations shown in FIG. 3A, the photonic bandgap exists in a region of the normalized frequency from 0.239 to 0.306.

Under the above conditions, when a single-line portion of the photonic crystal structure 3 is removed and the line defect optical waveguide 8 is formed in the photonic crystal structure 3, if a waveguide band of the line defect optical waveguide 8 exists in the above photonic bandgap, light can be strongly confined in the line defect optical waveguide 8, and the line defect optical waveguide 8 is able to operate as an optical waveguide.

Below, an explanation is made of a waveguide band of the line defect optical waveguide 8 in the photonic crystal structure 3 when the equivalent refractive index of the high refractive index thin film 2 is approximately three, assuming the line defect optical waveguide 8 has a normal width.

Figure 4:
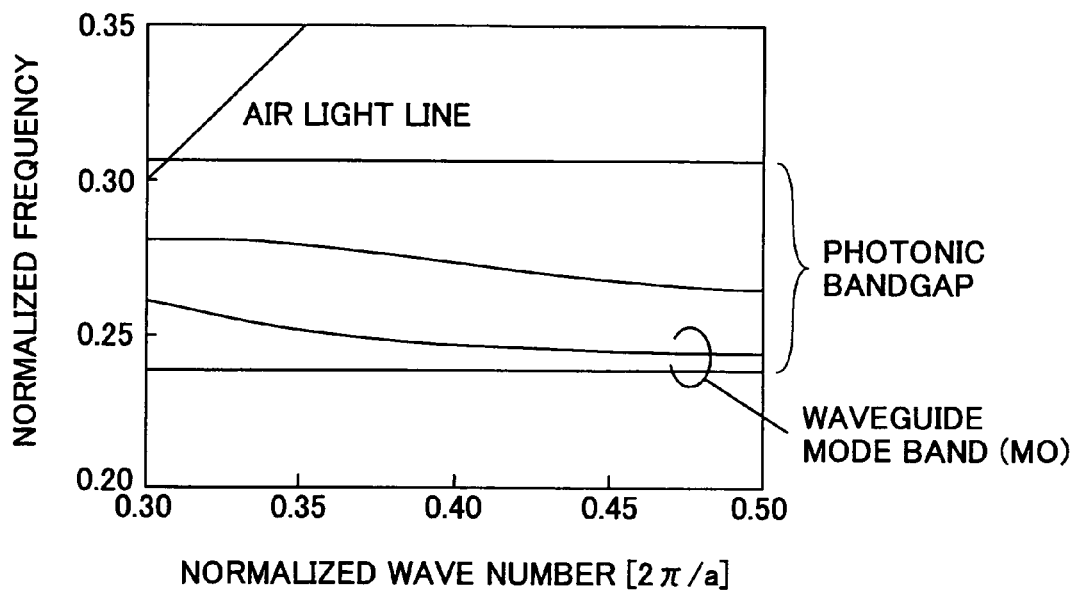
FIG. 4 shows a photonic band diagram of the photonic crystal structure 3 including the line defect optical waveguide 8 but having a normal width.

FIG. 4 shows a photonic band diagram of the photonic crystal structure 3 including the line defect optical waveguide 8 but having a normal width.

Similar to FIG. 3A, the calculations are made by enlarging unit lattices by two-dimensional plane wave expansion for modeling of the line defect optical waveguide 8, the abscissa represents a normalized wave number in units of $2\pi/a$, and the ordinate represents a normalized frequency. In FIG. 4, the photonic bandgap obtained in calculations presented in FIG. 3A is also indicated for purposes of comparison.

As shown in FIG. 4, there exist two bands in the photonic bandgap, and these two bands correspond to two propagation modes of the line defect optical waveguide 8.

The propagation mode MO in the photonic bandgap having a low frequency is called an "even mode", corresponding to a waveguide mode in which the electro-magnetic field of the light being guided becomes strong at the center of the line defect optical waveguide 8.

The propagation mode MO in the photonic bandgap having a high frequency is called an "odd mode", corresponding to a waveguide mode in which the electro-magnetic field of light becomes zero at the center of the line defect optical waveguide 8.

It is clear that the waveguide mode MO is suitable for constructing an optical transmission path, and below focus is placed on the waveguide mode MO.

In the two-dimensional photonic crystal slab structure, as is known, if the frequency of light is higher than a straight line referred to as a "light line", which is given by the refractive index nc of a cladding portion, the light leaks out to the cladding portion; to the contrary, if the frequency of light is lower than the light line, in principle, the light can be transmitted while being completely confined.

In the photonic band diagram, the light line is represented by a straight line given by 1/nc. If the cladding portion is air, the slope becomes 1. The air-bridge structure can be formed by arranging air spaces in the upper and lower portions, respectively.

In FIG. 4, a light line corresponding to an air cladding portion is also illustrated.

Because the photonic band diagram is expressed as a dispersion relation between a frequency $\omega$ and a wave number N, for a propagation mode, its derivative (secondary dispersion) corresponds to an inverse number of a group speed (Vg/c0) normalized by the speed of the light c0 in the vacuum. From this relation, the group refractive index ng can be expressed as follows.

$$\partial\omega/\partial k = 1/Vg = ng$$

Namely, an inverse number of the slope of the propagation mode gives the group refractive index ng. From this result, the relation shown in FIG. 5 can be obtained.

Figure 5:
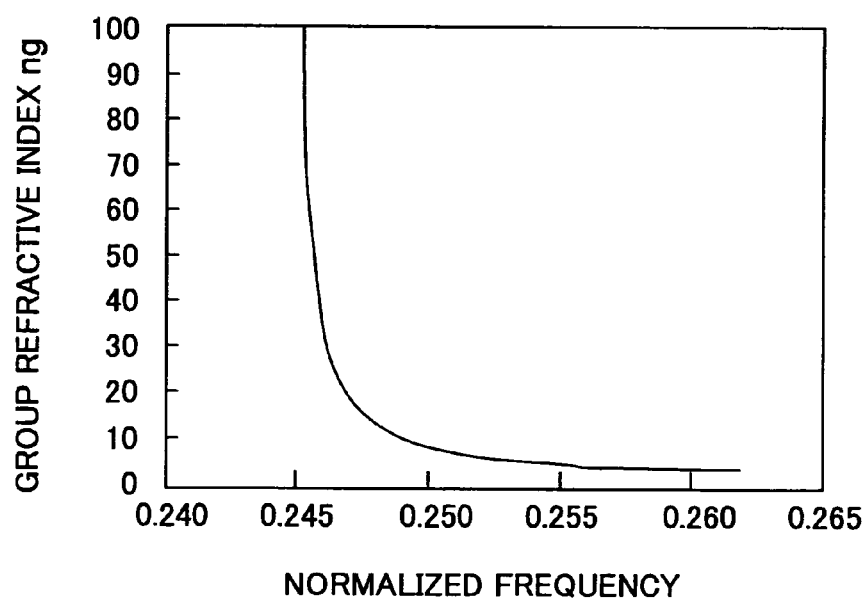
FIG. 5 shows a relation between the group refractive index ng of the propagation mode MO and the normalized frequency ω.

FIG. 5 shows a relation between the group refractive index ng of the propagation mode MO and the normalized frequency $\omega$.

As shown in FIG. 5, as the normalized frequency $\omega$ decreases, the group refractive index ng increases drastically, and the group refractive index ng even exceeds 50. However, because this variation is so drastic, as predicted in scientific papers, the group refractive index ng depends on the wavelength strongly. For example, at a normalized frequency $\omega$ of 0.246, corresponding to a group refractive index ng of 30, if the normalized frequency $\omega$ varies by only 0.0005 with $\omega=0.246$ as a center, that is, the normalized frequency $\omega$ varies from 0.2455 to 0.2465, the group refractive index ng jumps from 24 to 60. Because the refractive index varies even when the wavelength changes slightly, it is difficult to use this line defect optical waveguide 8 as an optical pulse delay element.

Figure 6:
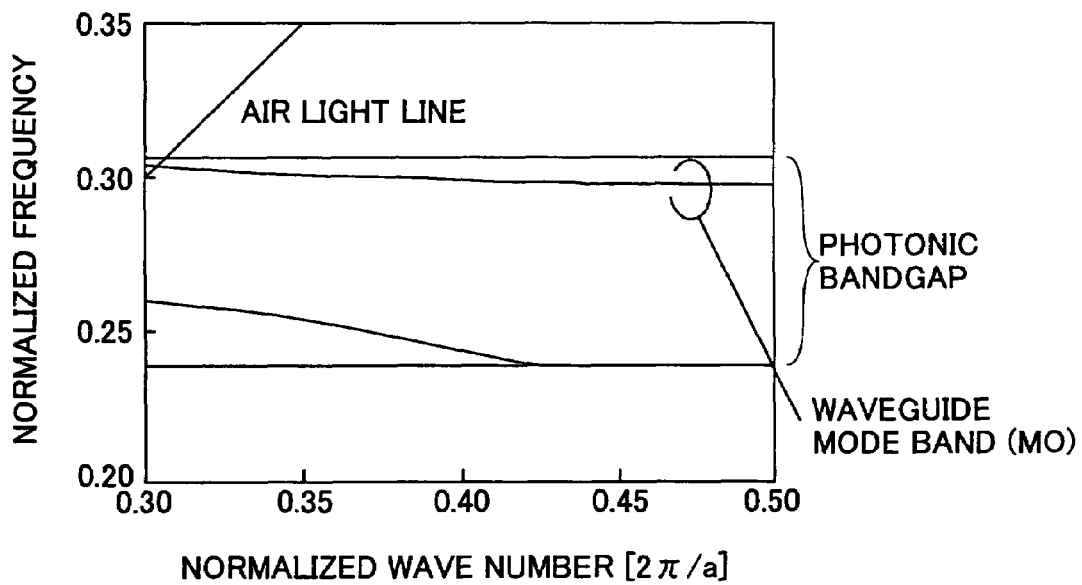
FIG. 6 shows a photonic band diagram of the photonic crystal structure 3 including the line defect optical waveguide 8 having a reduced width according to the present embodiment.

FIG. 6 shows a photonic band diagram of the photonic crystal structure 3 including the line defect optical waveguide 8 having a reduced width according to the present embodiment.

As described with reference to FIG. 2, the width of the line defect optical waveguide 8 is denoted as $(D-2d)$, and in a common line defect optical waveguide, the width D and the pitch "a" satisfy the relation: $D=3^{0.5}a$.

In calculations shown in FIG. 6, the width of the line defect optical waveguide 8 is reduced to be $d=0.25a$, that is, roughly reduced to be 75% of the width ($D=3^{0.5}a$) of the common line defect optical waveguide. Other conditions used in the calculation shown in FIG. 6 are the same as the previous calculations.

As shown in FIG. 6, there exists only one waveguide band in the photonic bandgap, corresponding to the propagation mode MO in the photonic bandgap, and the propagation mode MO appears in the high frequency region.

Figure 7:
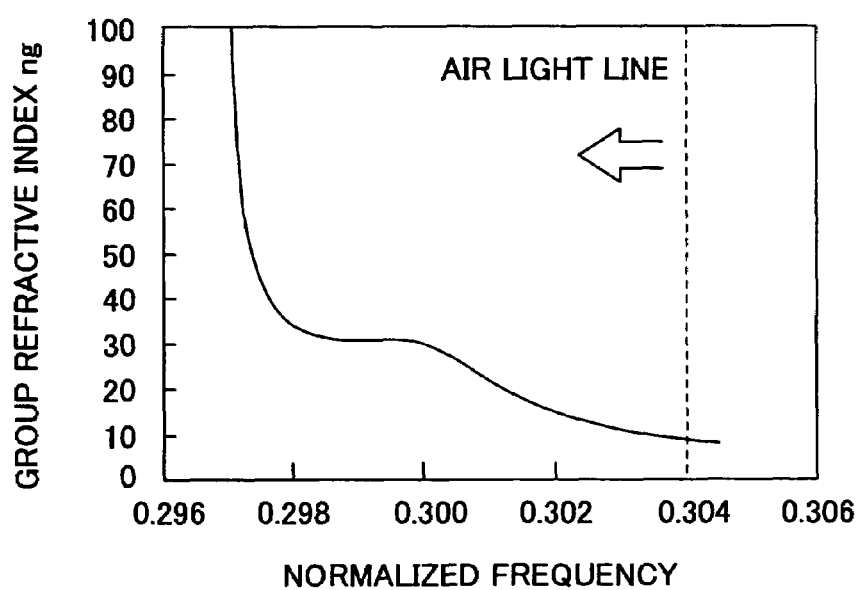
FIG. 7 shows a relation between the group refractive index ng of the propagation mode MO and the normalized frequency ω.

FIG. 7 shows a relation between the group refractive index ng of the propagation mode MO and the normalized frequency $\omega$.

As shown in FIG. 7, there appears a plateau when the normalized frequency $\omega$ is around 0.300, in which the group refractive index ng varies very little.

Figure 8:
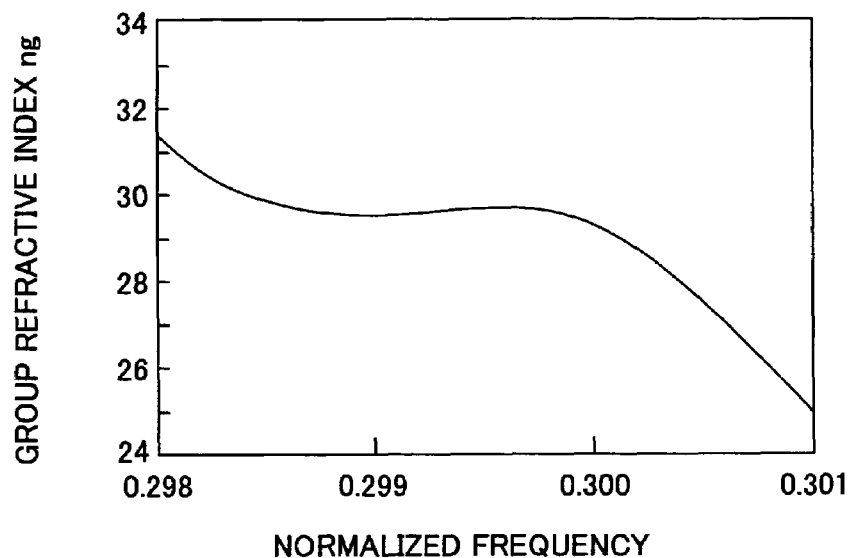
FIG. 8 shows the plateau of the curve in FIG. 7.

FIG. 8 shows the plateau of the curve in FIG. 7.

As it is shown in FIG. 8, when the normalized frequency $\omega$ is around 0.300, the group refractive index ng approximately equals 30, and changes only slightly.

In this plateau region, for example, even when the normalized frequency $\omega$ changes by 0.3%, variation of the group refractive index ng is below 0.5. That is, compared to a common line defect optical waveguide, variation of the group refractive index ng is reduced greatly, and there exists a frequency region in which the group refractive index ng can be held to be 30.

A 0.3% change of the frequency corresponds to, for example, a 5 nm change of a wavelength of 1500 nm. When using a laser in modern DWDM optical communications, highly probably, laser oscillation wavelength control can be performed in this region. When the group refractive index ng is 30, in the related art, an optical fiber (refractive index: 1.5) as long as 20 cm is required, but in the present embodiment, the length of the optical pulse delay element can be reduced to $1.5/30=1/20$ of the optical fiber in the related art, that is 1 cm. Therefore, it is possible to greatly reduce the size of the optical pulse delay element up to the level of the so-called photonic IC used in optical transmission, which includes the photonic crystal.

In addition, as shown in FIG. 8, there exists a frequency region in which the slope of the group refractive index curve is zero, that is, dispersion of the group refractive index ng is zero. The frequency dispersion D (secondary dispersion) of the group refractive index ng is defined as below:

$$D=\partial ng/\partial\omega=1/\partial\omega(\partial k/\partial\omega)=\partial^2 k/\partial^2\omega$$

Figure 9:
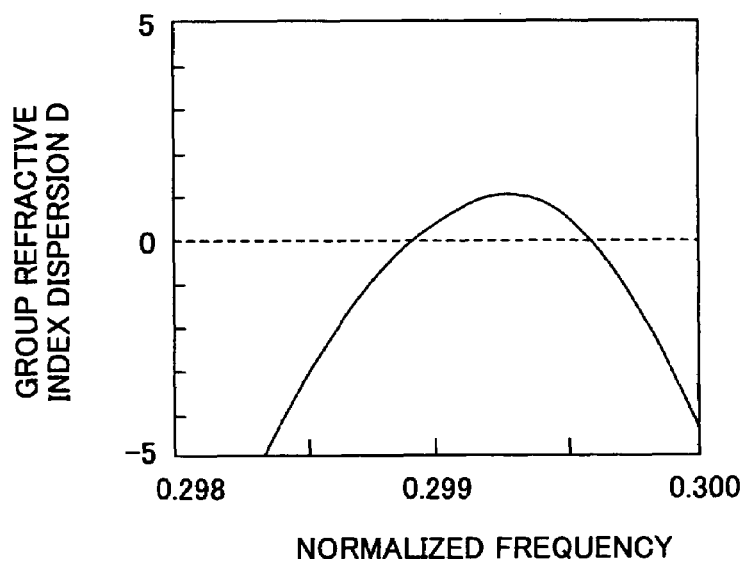
FIG. 9 shows a relation between frequency dispersion D and the normalized frequency ω of the waveguide mode MO.

FIG. 9 shows a relation between frequency dispersion D and the normalized frequency ω of the waveguide mode M0.

As shown in FIG. 9, in the waveguide mode M0, there exists a frequency dispersion D equaling zero in the secondary dispersion curve. Further, from the secondary dispersion curve in FIG. 9, it is clear that in the waveguide mode M0, there exist a slope of frequency dispersion D (secondary dispersion) equaling zero, that is, in the waveguide mode M0, there exists a point where the third order dispersion curve becomes zero.

As a result, with relevant parameters being appropriately specified, it is expected that the width of the plateau in the dispersion curve in FIG. 7 and FIG. 8 can be further expanded, and a more flexible optical pulse delay element can be obtained.

Figure 10:
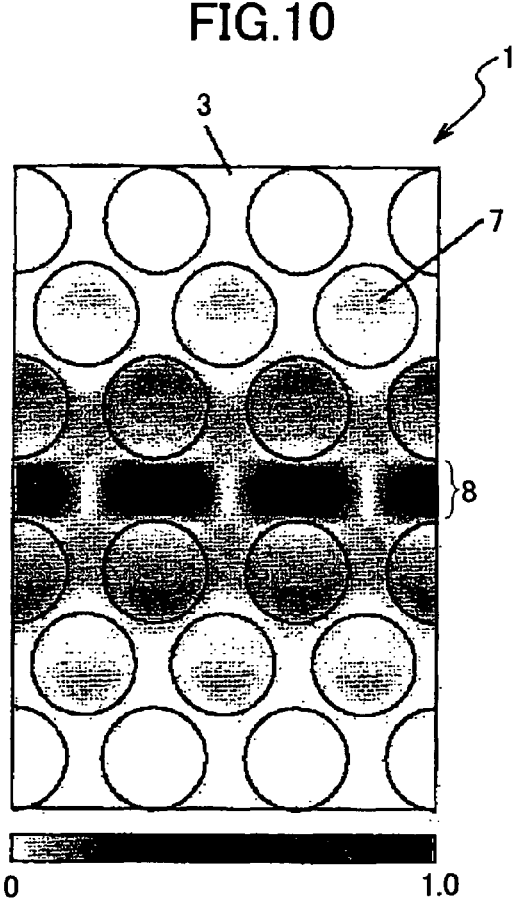
FIG. 10 is a diagram illustrating the electromagnetic field distribution of light in the waveguide mode MO according to the present embodiment.

FIG. 10 is a diagram illustrating the electromagnetic field distribution of light in the waveguide mode M0 according to the present embodiment.

As shown in FIG. 10, the guided light propagates in the even mode, in which the maximum of the electromagnetic field of the light being guided appears at the center of the line defect optical waveguide 8 having a reduced width.

Figure 11:
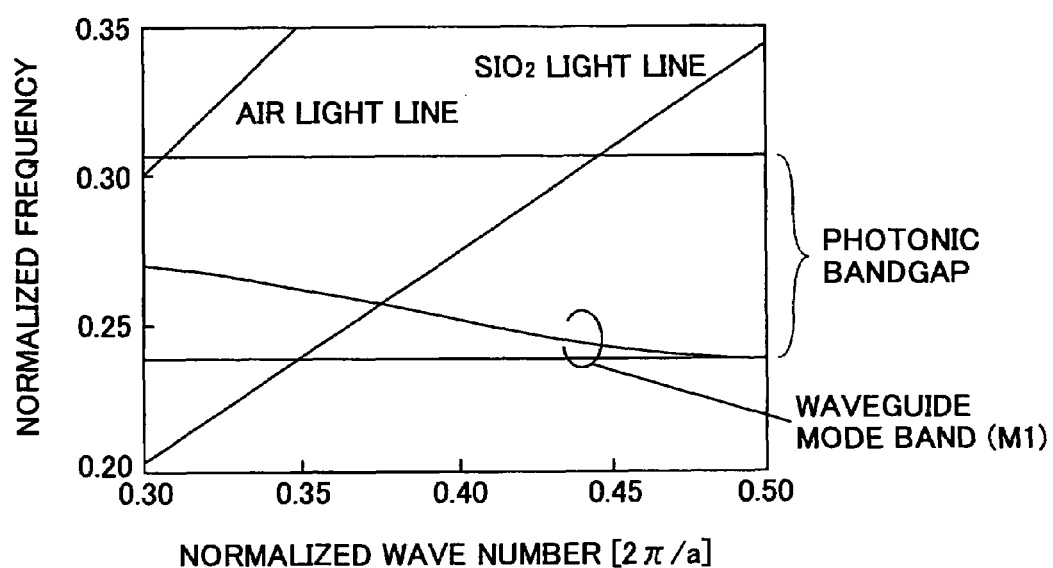
FIG. 11 shows a photonic band diagram of the photonic crystal structure 3 including the line defect optical waveguide 8 having a different reduced width, assuming the equivalent refractive index of the high refractive index thin film 2 is approximately three.

For purposes of comparison, FIG. 11 shows a photonic band diagram of the photonic crystal structure 3 including the line defect optical waveguide 8 having a different reduced width, assuming the equivalent refractive index of the high refractive index thin film 2 is approximately three.

In FIG. 11, it is assumed that the width of the line defect optical waveguide 8 is reduced to be d=0.30a, that is, roughly reduced to be 70% or less of the width (D=$3^{0.5}$a) of the common line defect optical waveguide. Other conditions in the calculation shown in FIG. 7 are the same as the previous calculations.

As shown in FIG. 11, the propagation mode M0 does not exist in the photonic bandgap; instead, a different band M1 appears in the photonic bandgap, and serves as a waveguide band.

The waveguide band M1 also corresponds to the even mode, but shows quite different properties from the waveguide band M0. The waveguide band M1 is discussed in the reference 1, and as described in the reference 1, the waveguide band M1 can be used as an optical transmission path of a wide band, and is useful as a single mode waveguide having a large group speed (small group refractive index). Conversely speaking, if the width of the line defect optical waveguide 8 is reduced to be less than 70% of the width (D=$3^{0.5}$a) of the common line defect optical waveguide, the group refractive index decreases, and the band M1 appears in the photonic bandgap and serves as a waveguide band. This is opposite to the object of the present invention to obtain a large group refractive index and small wavelength dispersion of the group refractive index.

Therefore, in the present embodiment, it is preferable to set the width of the line defect optical waveguide 8 to be greater than 70% and less than 90% of the width of the common line defect optical waveguide, and more preferably, to be greater than 70% and less than 80% of the width of the common line defect optical waveguide.

When the width of the line defect optical waveguide 8 is less than 90% of the width of the common line defect optical waveguide, in spite of a large group speed, the waveguide band M0 causes small wavelength dispersion of the group refractive index. Further, when the width of the line defect optical waveguide 8 is less than 80% of the width of the common line defect optical waveguide, the waveguide band M0 causes very small wavelength dispersion of the group refractive index.

On the other hand, if it is desired to generate distortion in the waveguide band M0 by increasing the width of the line defect optical waveguide 8, it is preferable to set the width of the line defect optical waveguide 8 to be greater than 1.05 and less than 1.5 times the width of the common line defect optical waveguide, and more preferably, to be greater than 1.1 and less than 1.3 times the width of the common line defect optical waveguide. Due to this, unwanted influence on the waveguide band can be reduced.

Comparing the reference 1 with the results in FIG. 6 of the present embodiment, although the present embodiment and the reference 1 appear similar in that the width of the line defect optical waveguide is decreased, the present embodiment and the reference 1 are completely different in that the waveguide bands to be used are different; further, while the reference 1 aims to reduce the group refractive index, the object of the present embodiment is to increase the group refractive index and decrease the wavelength dispersion of the group refractive index. Consequently, ideas of the present embodiment and the reference 1 are completely different. Although both the present embodiment and the reference 1 adopt the method of reducing the width of the line defect optical waveguide, the resulting preferable ranges of the width of the line defect optical waveguide are totally different in the present embodiment and the reference 1. In addition, the design values of the holes and applicable wavelength band are also different.

Below, the characteristics of the object waveguide band in the present embodiment are explained in detail with reference to FIG. 12A through FIG. 12C, this further clearly shows the differences between the present embodiment and the reference 1.

Qualitatively, it is thought that the waveguide band in a photonic crystal is composed of coupled states of various bands which induce a refractive index confinement mode, and a confinement mode due to the photonic bandgap.

Figure 12C:
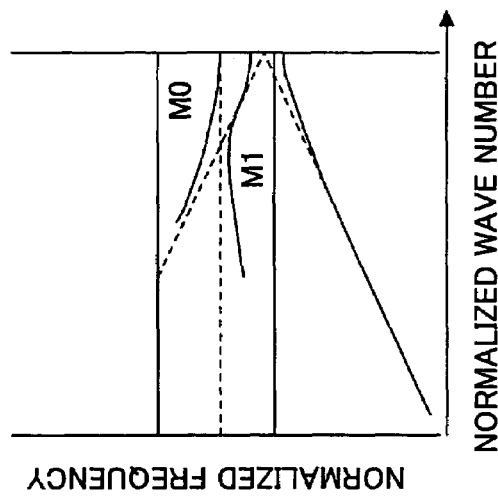
FIG. 12C shows a band diagram in which the band B1 and the band B2 are coupled in the photonic bandgap.
Figure 12A:
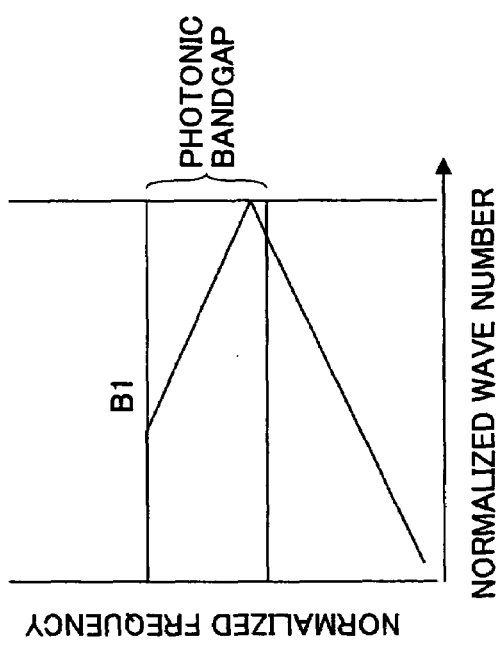
FIG. 12A shows a band diagram in which a band B1 corresponds to a refractive index confinement mode.
Figure 12B:
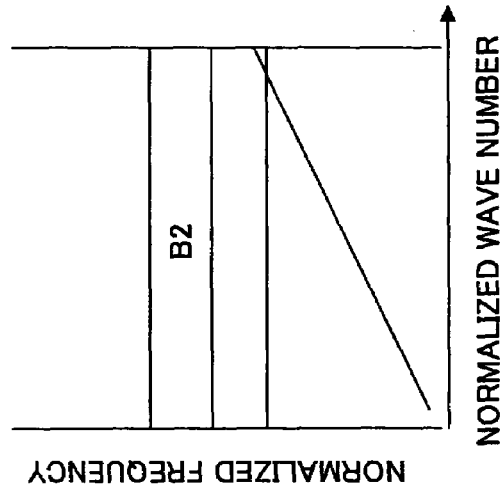
FIG. 12B shows a band diagram in which a band B2 corresponds to the photonic bandgap confinement mode.

FIG. 12A through FIG. 12C show the waveguide band in a photonic crystal qualitatively.

FIG. 12A shows a band diagram in which a band B1 corresponds to a refractive index confinement mode. In FIG. 12A, the band diagram is folded.

FIG. 12B shows a band diagram in which a band B2 corresponds to the photonic bandgap confinement mode.

The band B2 is different from the band B1, and the photonic bandgap confinement mode is the same as the propagation mode of electromagnetic waves transmitted in a waveguide tube.

FIG. 12C shows a band diagram in which the band B1 and the band B2 are coupled in the photonic bandgap.

As shown in FIG. 12C, the band B1 and the band B2 are coupled in the photonic bandgap, thus forming the waveguide band M0 and the waveguide band M1.

The object waveguide band in the present embodiment is the waveguide band M0. That is, the waveguide band M0 is generated due to coupling of the refractive index confinement mode and the photonic bandgap confinement mode, and is in a frequency region higher than the photonic bandgap confinement mode.

In contrast, in reference 1, the object waveguide band is the waveguide band M1. Although the waveguide band M1 is also due to coupling of the refractive index confinement mode and the photonic bandgap confinement mode, it is in a frequency region lower than the photonic bandgap confinement mode.

Next, characteristics of the waveguide band in the present embodiment (waveguide band M0) are studied in detail with reference to FIG. 13A through FIG. 13I.

The characteristics of the waveguide band in the present embodiment are revealed in the third order dispersion curve, which is a function of the frequency of the light guided in the waveguide.

Figure 13C:
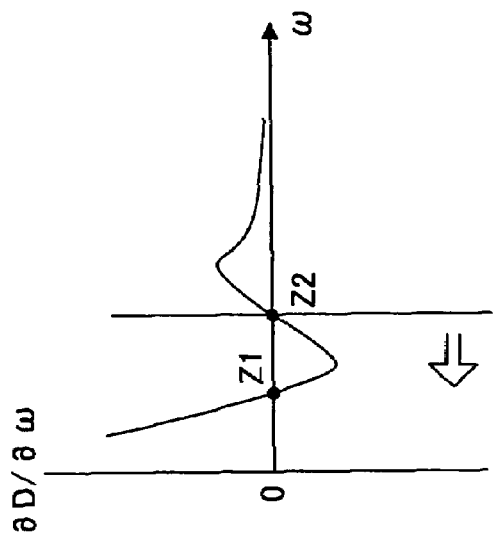
FIG. 13A through FIG. 13C show the first order dispersion curve, the second order dispersion curve, and the third order dispersion curve of the line defect optical waveguide according to the present embodiment.
Figure 13B:
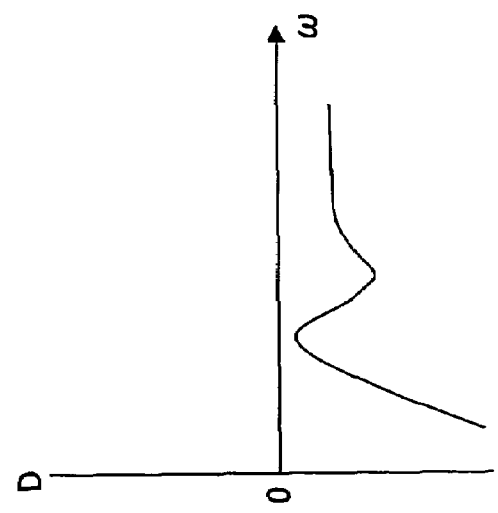
Figure 13A:
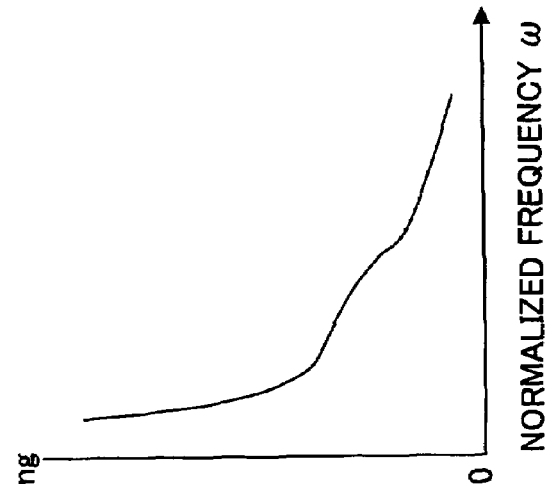

FIG. 13A through FIG. 13C show the first order dispersion curve, the second order dispersion curve, and the third order dispersion curve of the line defect optical waveguide according to the present embodiment.

Figure 13F:
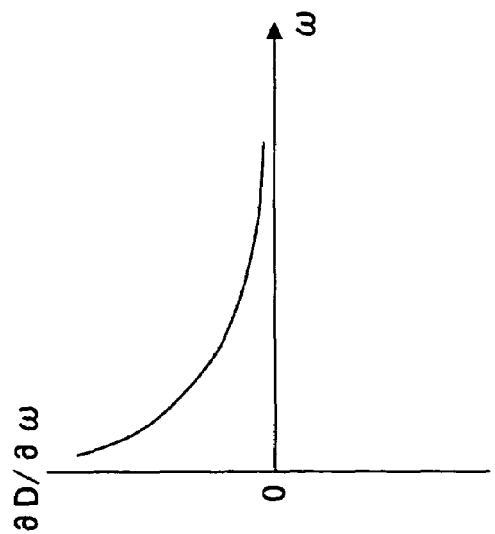
FIG. 13D through FIG. 13F show the first order dispersion curve, the second order dispersion curve, and the third order dispersion curve of a line defect optical waveguide of the related art.
Figure 13E:
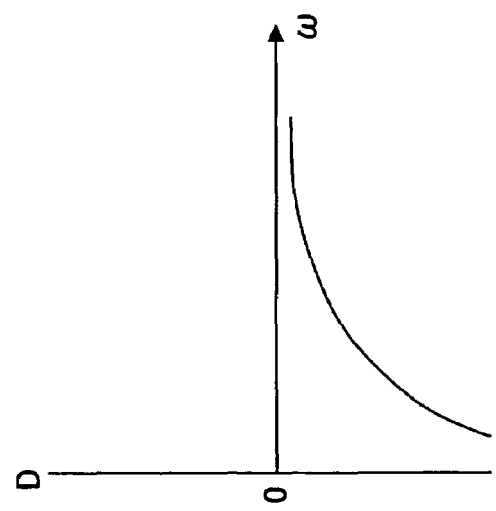
Figure 13D:
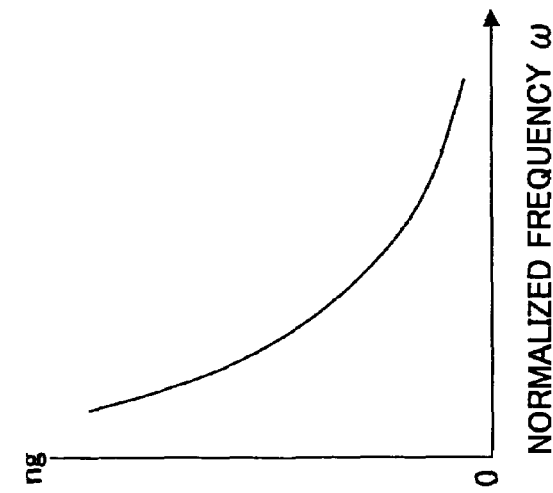

FIG. 13D through FIG. 13F show the first order dispersion curve, the second order dispersion curve, and the third order dispersion curve of a line defect optical waveguide of the related art (also referred to as a "common line defect optical waveguide"), which is formed by removing a single-line portion of the photonic crystal structure 3 without any other modifications.

Figure 13G:
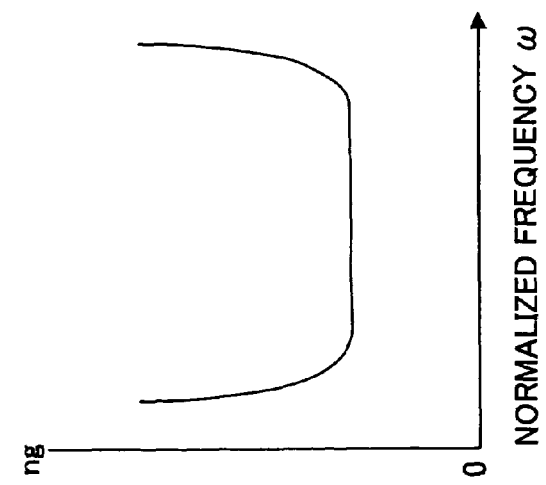
FIG. 13G through FIG. 13I show the first order dispersion curve, the second order dispersion curve, and the third order dispersion curve of another kind of photonic crystal waveguide called a "coupled defect optical waveguide"
Figure 13H:
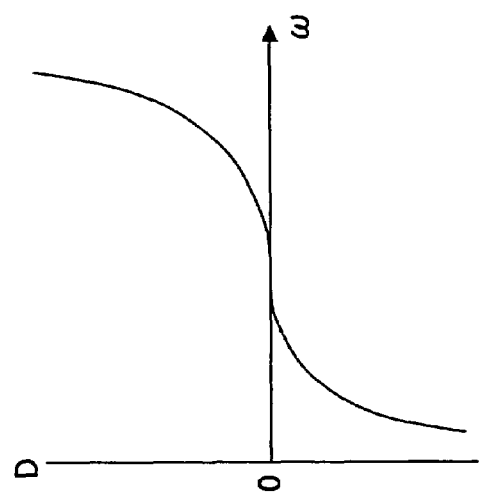
Figure 13I:
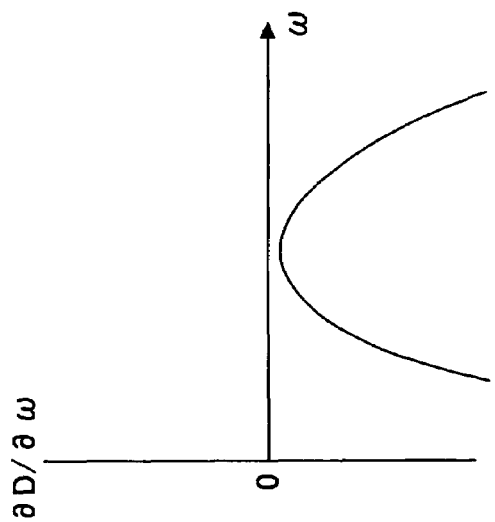

FIG. 13G through FIG. 13I show the first order dispersion curve, the second order dispersion curve, and the third order dispersion curve of another kind of photonic crystal waveguide called "coupled defect optical waveguide".

The first order dispersion curve corresponds to the aforesaid group refractive index ng, the second order dispersion (or secondary dispersion) curve corresponds to the aforesaid frequency dispersion D of the group refractive index ng, and the third order dispersion curve corresponds to the derivative of the frequency dispersion D with respect to the frequency ω.

The coupled defect optical waveguide shown in FIG. 13G through FIG. 13I includes the common line defect optical waveguide shown in FIG. 13D through FIG. 13F, and further has a resonator structure. For example, the coupled defect optical waveguide is disclosed in reference 2. In reference 2, it is disclosed that the coupled defect optical waveguide shows effects as a dispersion compensation element; additionally, it is known that the coupled defect optical waveguide shows a group refractive index curve as presented in FIG. 6. In other words, even for the coupled defect optical waveguide, there exists a frequency region in which the frequency dispersion of the group refractive index equals zero.

As shown in FIG. 13C, in the third order dispersion curve of the line defect optical waveguide 8 of the present embodiment, the third order dispersion becomes zero at frequencies Z1 and Z2. In addition, near the frequency Z1, the third order dispersion has opposite signs before and after the frequency Z1. Similarly, near the frequency Z2, the third order dispersion has opposite signs before and after the frequency Z2.

Defining a zero point of the third order dispersion curve as frequencies satisfying $$\partial D / \partial \omega = 0$$

Namely, the third order dispersion curve of the line defect optical waveguide 8 of the present embodiment has two zero points at frequencies Z1 and Z2.

In contrast, as shown in FIG. 13F, in the third order dispersion curve of the common line defect optical waveguide is a monotonic function, that is, the third order dispersion curve of the common line defect optical waveguide has no extremes, and does not change sign any where.

Further, as shown in FIG. 13I, in the third order dispersion curve of the coupled defect optical waveguide, although there exists one zero point, near the zero point the sign of the third order dispersion does not change.

From the results in FIG. 13A through FIG. 13I, it is clear that the band diagram of the optical delay element of the present embodiment is different from the band diagram of the related art.

As shown in FIG. 13C, there are two zero points at frequencies Z1 and Z2 in the third order dispersion curve of the band of the line defect optical waveguide 8 of the present embodiment. In a frequency region near the zero point Z1 and a frequency region adequately higher than the zero point Z2, the dispersion of the group refractive index is small.

The object of the present embodiment is to find frequency regions where the group refractive index is large and the wavelength dispersion of the group refractive index is small. This object can be attained in the frequency region from a frequency near the zero point Z1 to a frequency lower than the zero point Z2. When light having frequencies in this region is guided in the line defect optical waveguide 8 of the present embodiment, a large group refractive index and small wavelength dispersion of the group refractive index are obtainable.

More preferably, the frequency region satisfying requirements of the present embodiment is limited to be from a frequency near the zero point Z1 to a frequency corresponding to the extreme between zero points Z1 and Z2. When light having frequencies in this region is guided in the line defect optical waveguide 8 of the present embodiment, better effects can be obtained.

Meanwhile, in the frequency region near the zero point Z2 of the third order dispersion curve, the wavelength dispersion (secondary dispersion) of the group refractive index itself is not so small (refer to FIG. 13B), and cannot effectively attain the object of the present embodiment.

In contrast, in the frequency region from frequencies near the zero point Z1 to frequencies below the extreme between zero points Z1 and Z2, the group refractive index ng is large (refer to FIG. 13A), the wavelength dispersion D of the group refractive index itself is quite small (close to zero), (refer to FIG. 13B), and this frequency region is quite wide. Therefore, it is possible to obtain an optical delay element having a large group refractive index and small wavelength dispersion of the group refractive index in a wide wavelength region as desired.

Still more preferably, the frequency region satisfying requirements of the present embodiment is limited to be near the zero point Z1. When light having frequencies in this region is guided in the line defect optical waveguide 8 of the present embodiment, further high light propagation quality can be obtained.

Second Embodiment

Expansion of a frequency region resulting in a large group refractive index, as described in the first embodiment, occurs even in a photonic crystal including a slab of a different refractive index.

In this embodiment, descriptions are made of an optical delay element in which the equivalent refractive index of the high refractive index thin film 2 is about two. In the present embodiment, the same reference numbers are assigned to the same elements as described in the previous embodiment, and overlapping descriptions are omitted.

In a photonic crystal, if the contrast of refractive index is approximately two, a photonic bandgap appears in the photonic crystal. However, in the case of the two-dimensional photonic crystal slab structure, because of strong influences of light lines, design tolerance becomes small.

For example, a thin film substrate 2 having an equivalent refractive index near two is made, and the photonic crystal structure 3 constituted from the air holes 7 is arranged on the thin film substrate, and the air-bridge structure as shown in FIG. 1 is formed. In this way, a two-dimensional photonic crystal slab structure can be constructed, which has an equivalent refractive index near two.

For example, the thin film substrate 2 having an equivalent refractive index near two is obtainable by depositing electro-optical materials such as lithium niobate having a refractive index of 2.2, or non-linear optical materials on a material having a low refractive index, such as silica (refractive index: 1.45).

Certainly, the thin film substrate 2 having an equivalent refractive index near two is not limited to lithium niobate, but any material having a refractive index near two can be used.

With the substrate being formed from the electro-optical materials or non-linear optical materials, it is possible to construct active optical delay elements, which cannot be obtained by using silicon. Further, many of the electro-optical materials or non-linear optical materials have wide optical transparent regions, and wide available wavelength regions. For example, the electro-optical materials or non-linear optical materials include inorganic crystals such as lithium niobate, titanium niobate, KTP, or ceramics such as PZT, PLZT, or organic crystals or organic molecules such as azo dye, stil-benzene dye, and dust. These materials have electro-optical constants or non-linear constants greater than that of semiconductors, and the bulk refractive indexes thereof are about 2.5.

The substrate having an optical thin film on a material having a low refractive index can be formed by bonding and techniques of thin film formation. Specifically, an electro-optical material substrate or a non-linear optical material substrate is joined with a low refractive index material substrate, and then the electro-optical material substrate is thinned by grinding. Alternatively, ions are implanted into the electro-optical material substrate to form a substrate having a separation layer, this substrate is joined with the low refractive index material substrate, and an electro-optical material thin film is separated from the separation layer. Or a film can be formed directly on the low refractive index material substrate by Sol-Gel method to form a substrate having an optical thin film on a low refractive index material.

Figure 14:
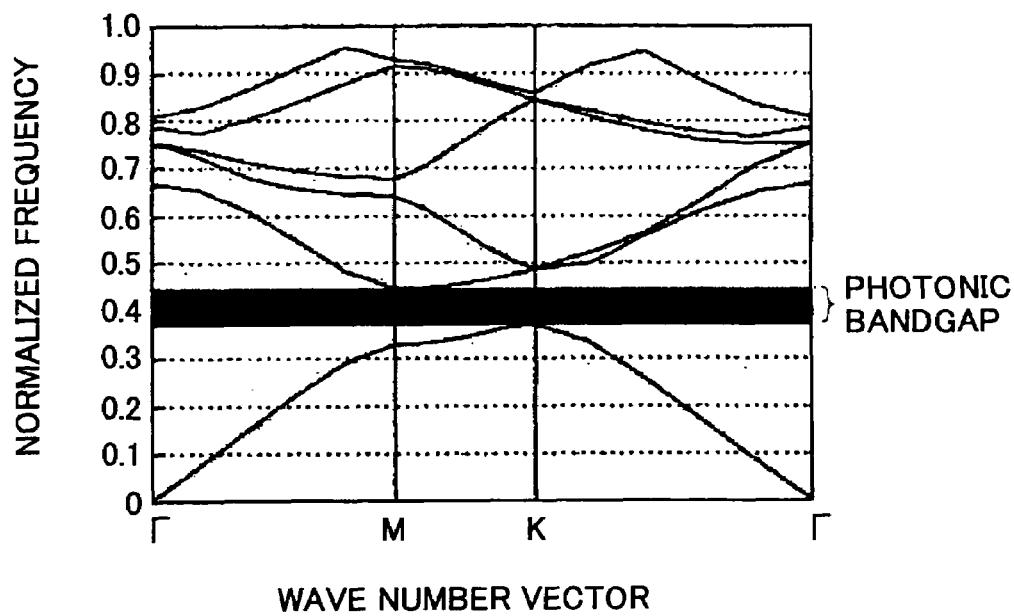
FIG. 14 shows a photonic band diagram of the photonic crystal structure 3 including a substrate according to the second embodiment of the present invention, in which the substrate has an equivalent refractive index approximately equaling two but without the line defect optical waveguide 8.

FIG. 14 shows a photonic band diagram of the photonic crystal structure 3 including a substrate according to the second embodiment of the present invention, in which the substrate has an equivalent refractive index approximately equaling two but without the line defect optical waveguide 8. In FIG. 14, the abscissa represents a wave number vector, and the ordinate represents a normalized frequency.

In calculations of FIG. 14, it is assumed that the air holes 7 (refractive index equals 1) are arranged in a manner of the triangular lattice, and the diameters of the holes 7 are 0.7 a. The method of calculations is the same as that described above.

From the photonic band diagram in FIG. 14, it is found that there exists a photonic bandgap in a region of the normalized frequency from 0.372 to 0.447. That is, due to the relatively small equivalent refractive index, the photonic bandgap shifts to the region of higher frequencies.

Under the above conditions, when a single-line portion of the photonic crystal structure 3 is removed and the line defect optical waveguide 8 is formed in the photonic crystal structure 3, if a waveguide band of the line defect optical waveguide 8 exists in the above photonic bandgap, light can be strongly confined in the line defect optical waveguide 8, and the line defect optical waveguide 8 is able to function as an optical waveguide.

Figure 15:
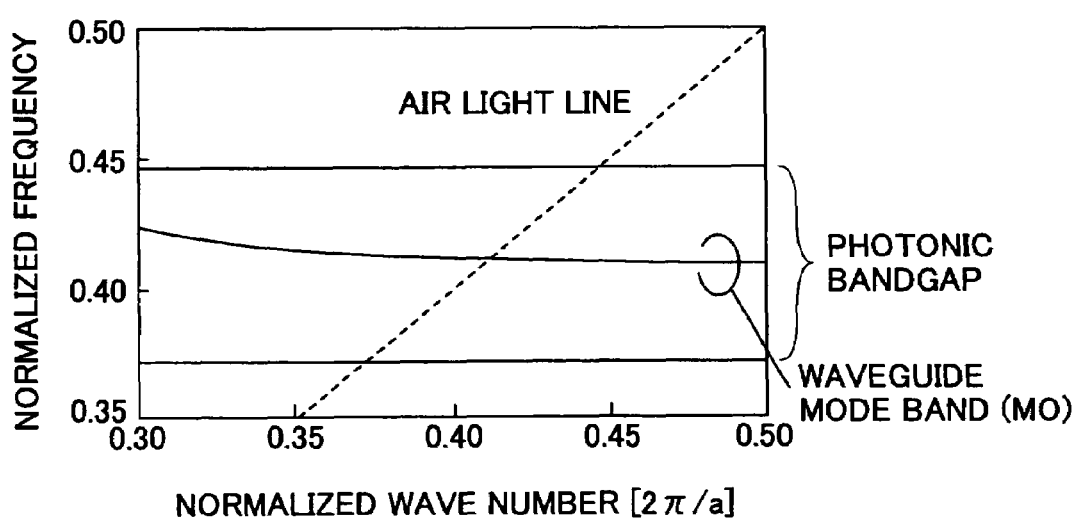
FIG. 15 shows a photonic band diagram of the photonic crystal structure 3 including the line defect optical waveguide 8.

FIG. 15 shows a photonic band diagram of the photonic crystal structure 3 including the line defect optical waveguide 8. In FIG. 15, the abscissa represents a normalized wave number in units of 2 π/a, and the ordinate represents a normalized frequency. It is assumed that the width of the line defect optical waveguide 8 is reduced by 0.15 a.

The calculation is made in the same way as described above.

As shown in FIG. 15, there exists a propagation mode M0 in the photonic bandgap. In this case, the air light line is influential. Further, because the photonic bandgap exists in a region corresponding to frequencies higher than those of the $SiO_2$ light line, the air-bridge structure is required.

Figure 16A:
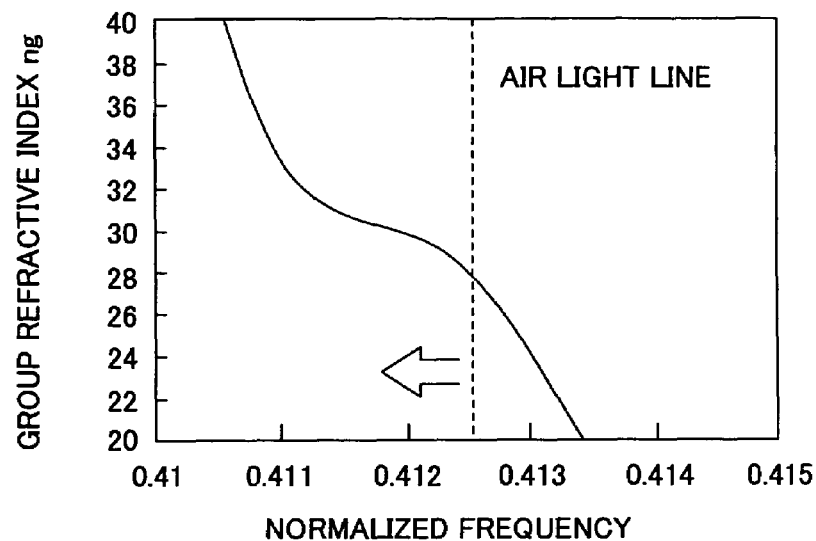
FIG. 16A shows the relation between the group refractive index ng of the propagation mode MO and the normalized frequency ω.

FIG. 16A shows the relation between the group refractive index ng of the propagation mode M0 and the normalized frequency ω.

As shown in FIG. 16A, there appears a region near the air light line in which the group refractive index ng varies slowly. For example, when the normalized frequency ω changes by 0.001, the group refractive index ng varies in the range from 30-1 to 30+1, so that a change of 0.001 of the normalized frequency corresponds to, for example, a change of 3 nm of a wavelength of 1500 nm.

As described above, when the group refractive index ng is 30, the optical fiber delay element in the related art is as long as 20 cm. According to the example shown in FIG. 16A, the length of the optical delay element can be reduced to 1 cm.

Figure 16B:
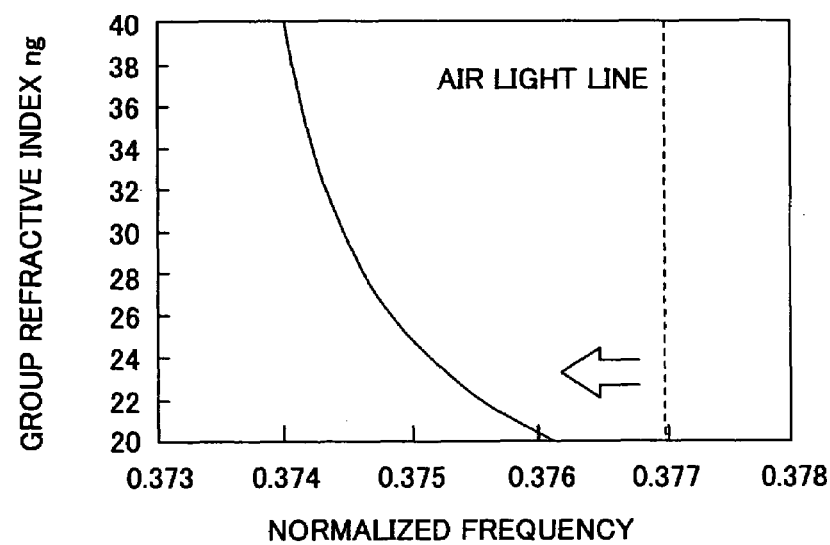
FIG. 16B, for comparison, shows a relation between the group refractive index ng of the propagation mode MO and the normalized frequency ω of the photonic crystal structure 3 in which the width of the line defect optical waveguide 8 is not reduced.

For purposes of comparison, FIG. 16B shows a relation between the group refractive index ng of the propagation mode M0 and the normalized frequency ω of the photonic crystal structure 3 in which the width of the line defect optical waveguide 8 is not reduced.

As shown in FIG. 16B, when the group refractive index ng is near 30, if the normalized frequency ω changes by 0.001, the group refractive index ng jumps from 25 to 40.

Hence, it is found that by reducing the width of the line defect optical waveguide 8, variation of the group refractive index ng of the line defect optical waveguide 8 is greatly reduced. Therefore, even when the refractive index of the slab is about two, by appropriately reducing the width of the line defect optical waveguide 8, it is possible to reduce dispersion of the group refractive index ng.

As described above, because the equivalent refractive index is relatively small, the photonic bandgap shifts to higher frequencies; due to this, the structure of this example is strongly influenced by the air light line. However, by appropriately constructing the photonic crystal structure or appropriately setting the refractive index, it is possible to obtain a region below the air light line in which the group refractive index ng is large, and the wavelength dispersion of the group refractive index ng is small. Further, instead of confinement effects due to total reflection on the upper and lower cladding portions, leakage of light into the cladding portions can be avoided by sandwiching with a multi-layer film, a metal reflection film, three-dimensional photonic crystal, or others.

Third Embodiment

In this embodiment, a method is described of fabricating the optical delay element of the present invention. In the present embodiment, the same reference numbers are assigned to the same elements as described in the previous embodiment, and overlapping descriptions are omitted.

As described above, a two-dimensional photonic crystal can be fabricated with a SOI (silicon-on-insulator) substrate and semiconductor fine processing techniques.

With the latest SOI technology, a SOI substrate including a 0.2 μm-thick silicon layer is commercially available, and this SOI substrate can be used to fabricate the two-dimensional photonic crystal.

The triangular lattice of holes can be built by lithography and dry etching. For example, an electron-beam resist is applied on a substrate, then the resist is patterned by drawing circular holes having diameter of 400 nm in the resist with an electron beam. The diameter of the holes is decided by the object light wavelength of the photonic crystal. Then, with the resist pattern as a mask, dry etching is executed by using fluorocarbon to transfer the circular hole pattern to a silicon layer. Then the electron-beam resist is removed, and a two-dimensional photonic crystal slab is completed.

Then, the $SiO_2$ layer of the SOI substrate is removed by using hydrogen fluoride, and the silicon layer is exposed to air; thereby, an air-bridge structure is constructed. Alternatively, a semiconductor hetero substrate may be used. More specifically, selective oxidation hetero substrates, such as a GaInAsP/InP substrate or a combination of an AlGaAs/GaAs substrate and an oxide cladding layer, may be used to construct the air-bridge structure.

In addition, a structure may be used in which a semiconductor thin film is formed on a material having a low refractive index by bonding. With such a structure, it is possible to obtain high mechanical strength without using the air-bridge structure.

The air-bridge structure may be constructed by arranging an electro-optical material thin film on a sacrifice layer, and then selectively etching the sacrifice layer. For example, an electro-optical material thin film such as a lithium niobate thin film can be formed as follows. First, a separation layer is formed in advance in a lithium niobate substrate by ion implantation, then this lithium niobate substrate is joined with a SOI substrate, the lithium niobate is separated from the separation layer, and a lithium niobate thin film is obtained. After a resist is applied on the lithium niobate thin film substrate, the resist is patterned by drawing circular holes in the resist with electron beam. Then, with the resist pattern as a mask, dry etching is executed by using fluorocarbon to transfer the circular hole pattern to the lithium niobate thin film. Then the silicon layer is selectively etched, and the air-bridge structure based on the lithium niobate thin film is constructed.

When the step of the selective etching is not adopted, a metal mask layer may be used. In this case, a metal film can be deposited on the substrate in advance by evaporation or other methods, and is patterned by lithography to form the metal mask.

In addition, the photonic crystal may be formed by transfer with a mold. For example, a mold is formed, and on the mold a pillar type photonic crystal is arranged, which is a shape inverted to the object shape. A liquid material is cast in the pillar type photonic crystal portion, and is then joined on a base substrate. Afterward, the shape is fixed by sintering or other methods and the mold is removed. Then, a photonic crystal structure is obtained. Based on this mold, the photonic crystal structure can be mass-produced.

The mold can be fabricated by electron beam exposure or dry etching. When fabricating the mold, because the ultimate thickness of the thin film is below 0.5 μm, it is not necessary to set a large etching depth when forming the mold by dry etching, and hence it is expected that a large aspect ratio can be obtained. Furthermore, if materials which contract in sintering are selected, the photonic crystal structure can be separated from the mold relatively easily. In this case, the object size of the photonic crystal structure and the mold should be specified with magnitude of this contraction being considered during design.

In the above process, the thus fabricated thin film substrate is exposed in air. Of course, the thin film substrate may be covered by a low refractive index material. For example, this can be done by depositing an oxide layer on the cladding layer, or applying polymer by spin-coating.

In addition, in order to change the width of the line defect optical waveguide 8 and thus change the volume of the line defect optical waveguide 8, in addition to the method of enlarging or narrowing the photonic crystal structure 3 in a center-symmetry manner, slits or fine holes may be formed on two sides or one side of the line defect optical waveguide 8 in the photonic crystal structure 3, and this equivalently changes the width of the line defect optical waveguide 8. Further, the waveguide band may be modified by changing the size of the fine holes on the two sides of the line defect optical waveguide 8 to equivalently modify the width of the line defect optical waveguide 8. Furthermore, in order to modify the waveguide band, it is also effective to change the refractive index of the line defect optical waveguide 8, or change the thickness of the waveguide portion.

By changing the width of the line defect optical waveguide 8 and in turn changing the volume of the line defect optical waveguide 8, distortion can be generated on the waveguide mode of the photonic band. Due to this distortion, it is possible to find regions other than a band end, in which the wavelength dispersion of the group refractive index is small, further, near a low group refractive index side of this region, it is possible to obtain both small wavelength dispersion of the group refractive index and large delay effect of the group speed.

Fourth Embodiment

Figure 17:
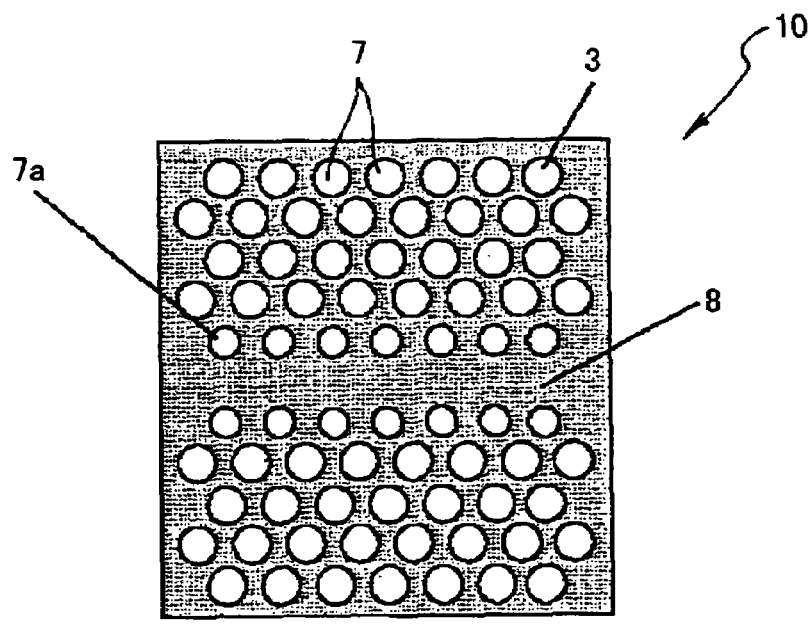
FIG. 17 is a plan view for schematically illustrating an optical delay element 10 according to a fourth embodiment of the present invention, which includes a line defect optical waveguide 8 formed from a two-dimensional photonic crystal slab.

FIG. 17 is a plan view for schematically illustrating an optical delay element 10 according to a fourth embodiment of the present invention, which includes a line defect optical waveguide 8 formed from a two-dimensional photonic crystal slab.

In the present embodiment, the same reference numbers are assigned to the same elements as described in the previous embodiment, and overlapping descriptions are omitted.

In the optical delay element 10 shown in FIG. 17, fine holes 7a are formed on two sides of the line defect optical waveguide 8, and the waveguide band is modified by changing the size of the fine holes 7a on two sides of the line defect optical waveguide 8. In FIG. 17, the size of the fine holes 7a is equivalent to 80% of the size of the fine hole 7.

Figure 18:
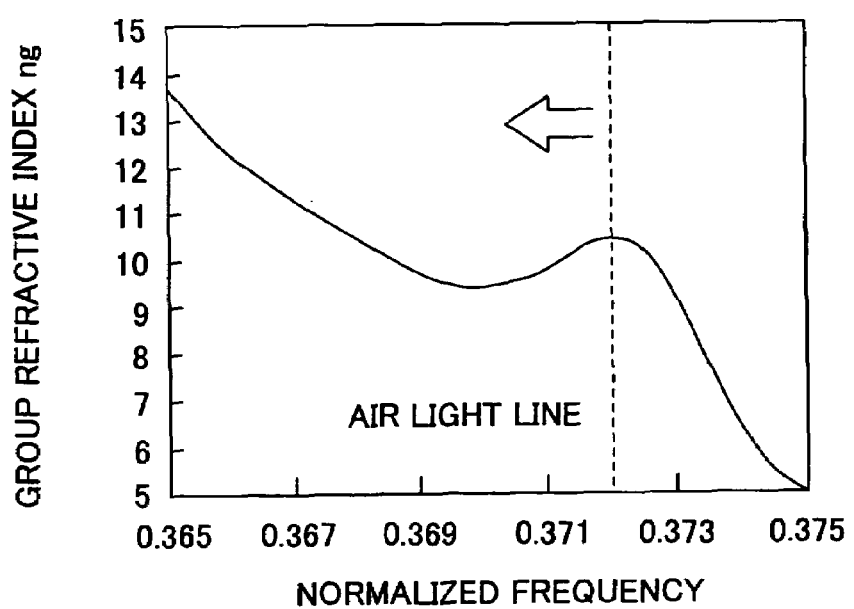
FIG. 18 shows a relation between the group refractive index ng of the propagation mode MO and the normalized frequency ω of in the photonic crystal of the optical delay element 10 in FIG. 17.

FIG. 18 shows a relation between the group refractive index ng of the propagation mode MO and the normalized frequency ω of in the photonic crystal of the optical delay element 10 in FIG. 17.

The results in FIG. 18 are obtained by the same numerical calculations as those shown in FIG. 7.

That is, the photonic band of the line defect optical waveguide 8 in the optical delay element 10 in FIG. 17 is calculated by the same numerical calculations as previously described, and from the photonic band, the group refractive index ng is calculated; further, the frequency dispersion of the group refractive index ng is calculated. Shown in FIG. 18 is the obtained frequency dispersion of the group refractive index ng.

As shown in FIG. 18, the group refractive index ng varies only slightly around 11, when the normalized frequency $\omega$ is from 0.367 to 0.373. In addition, with the normalized frequency $\omega$ being below 0.372, it is possible to avoid the influence of the light line.

From these results, it is clear that when the structure near the line defect optical waveguide 8 is modified by increasing the effective group refractive index of the line defect optical waveguide 8, variation of the effective group refractive index is greatly reduced.

It should be noted that the structure in FIG. 17 is just an example of the present embodiment, and the present embodiment is not limited to this example.

According to the present embodiment, by changing the line defect optical waveguide 8 appropriately, it is possible to avoid the influence of the light line, and obtain an optical waveguide in which the group refractive index is essentially constant in a wide frequency region.

In the present embodiment, the width of the line defect optical waveguide 8 need not be reduced. This makes it easy to introduce bends or branches in the line defect optical waveguide 8; in contrast, introduction of bends or branches in the line defect optical waveguide 8 is difficult when the width of the line defect optical waveguide 8 is reduced. Therefore, by combining at least two of the configurations of a modified width, a modified shape, and a modified refractive index, it is possible to construct an optical delay element capable of optical control in a wide range.

Fifth Embodiment

Figure 19:
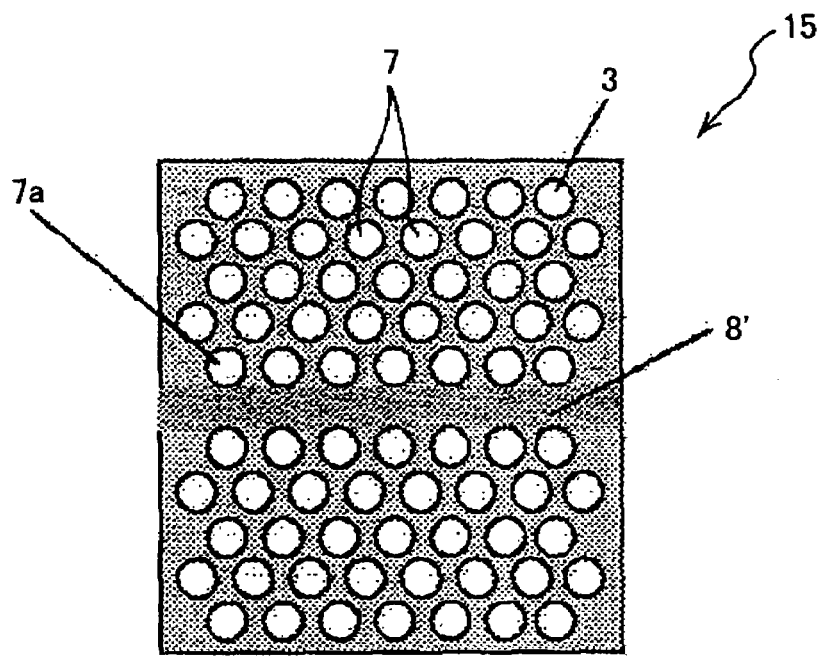
FIG. 19 is a plan view for schematically illustrating an optical delay element 15 according to a fifth embodiment of the present invention, which includes a line defect optical waveguide 8' formed from a two-dimensional photonic crystal slab.

FIG. 19 is a plan view for schematically illustrating an optical delay element 15 according to a fifth embodiment of the present invention, which includes a line defect optical waveguide 8' formed from a two-dimensional photonic crystal slab.

In the present embodiment, the same reference numbers are assigned to the same elements as described in the previous embodiments, and overlapping descriptions are omitted.

In the optical delay element 15 shown in FIG. 19, the refractive index of the line defect optical waveguide 8' is changed to modify the waveguide band of the line defect optical waveguide 8'.

Figure 20:
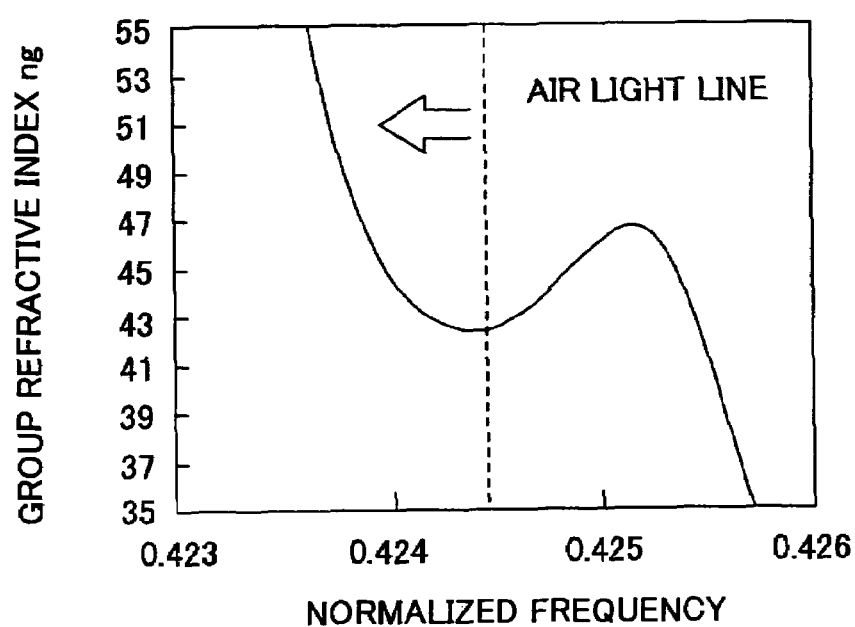
FIG. 20 shows a relation between the group refractive index ng of the propagation mode MO and the normalized frequency ω in the photonic crystal of the optical delay element 15 in FIG. 19.

FIG. 20 shows a relation between the group refractive index ng of the propagation mode MO and the normalized frequency $\omega$ in the photonic crystal of the optical delay element 15 in FIG. 19.

The results in FIG. 20 are obtained by the same numerical calculations as those shown in FIG. 7, wherein the refractive index of the line defect optical waveguide 8' is assumed to be 2.5.

That is, the photonic band of the line defect optical waveguide 8' is calculated by the same numerical calculations as previously described, and from the photonic band, the group refractive index ng is calculated, and further, the frequency dispersion of the group refractive index ng is calculated. Shown in FIG. 20 is the thus obtained frequency dispersion of the group refractive index ng.

In calculation of the two-dimensional plane wave expansion, the refractive index of portions of the photonic crystal structure 3 other than the line defect optical waveguide 8' is assumed to be 2.0, and the refractive index of the holes 7 in the photonic crystal structure 3 is assumed to be 1.0.

As shown in FIG. 20, the group refractive index ng of the line defect optical waveguide 8' varies only slightly. That is, with the refractive index of the line defect optical waveguide 8' being smaller than other portions, the same effects as the line defect optical waveguide 8 having a reduced width can be obtained.

Specifically, in FIG. 20, the group refractive index ng of the line defect optical waveguide 8' varies slightly around 45 when the normalized frequency $\omega$ is from 0.424 to 0.425. In addition, with the normalized frequency $\omega$ being below 0.4243, it is possible to avoid the influence of the light line.

From these results, it is clear that with the refractive index of the line defect optical waveguide 8' being modified, variation of the effective group refractive index is greatly reduced.

It should be noted that the portion having a modified refractive index is not limited to the line defect optical waveguide 8'. The same effects can be obtained even when the refractive index is modified in a region including the line defect optical waveguide 8' and the portion near the line defect optical waveguide 8'.

In addition, the structure in FIG. 19 is just an example of the present embodiment, and the present embodiment is not limited to this example.

According to the present embodiment, by changing the refractive index of the line defect optical waveguide 8 appropriately, it is possible to avoid the influence of the light line, and obtain an optical waveguide in which the group refractive index is essentially constant in a wide frequency region.

In the present embodiment, the width of the line defect optical waveguide 8' need not be reduced. This makes it easy to introduce bends or branches in the line defect optical-waveguide 8'; in contrast, introduction of bends or branches in the line defect optical waveguide 8' is difficult when the width of the line defect optical waveguide 8' is reduced. Therefore, by combining at least two of the configurations of a modified width, a modified shape, and a modified refractive index, it is possible to construct an optical delay element capable of optical control in a wide range.

Sixth Embodiment

Figure 21:
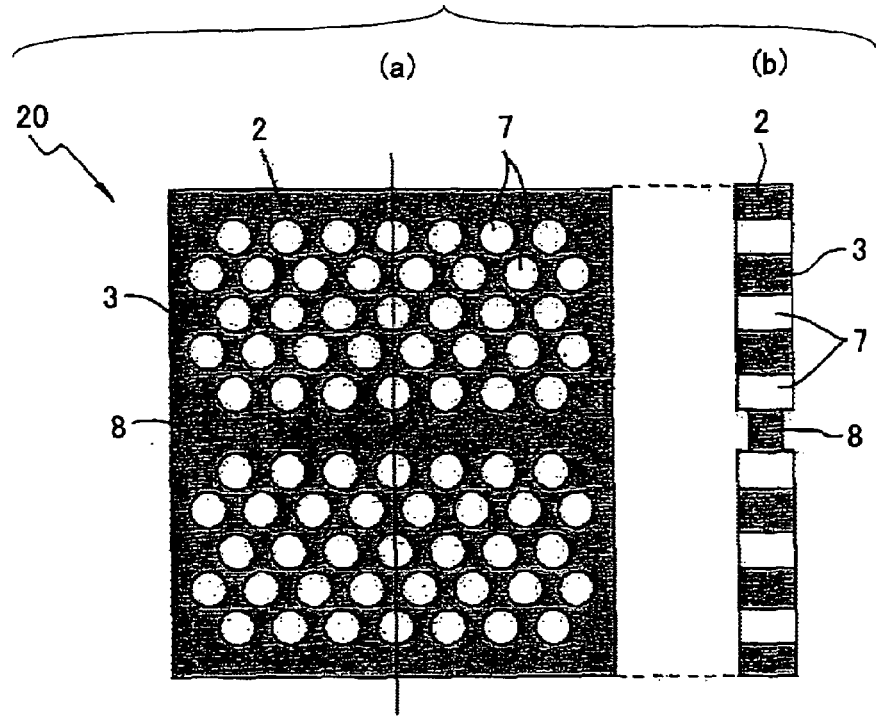
FIG. 21A and FIG. 21B are a plan view and a side view for schematically illustrating an optical delay element 20 according to a sixth embodiment of the present invention, which includes a line defect optical waveguide 8 formed from a two-dimensional photonic crystal slab.

FIG. 21A and FIG. 21B are a plan view and a side view for schematically illustrating an optical delay element 20 according to a sixth embodiment of the present invention, which includes a line defect optical waveguide 8 formed from a two-dimensional photonic crystal slab. In the present embodiment, the same reference numbers are assigned to the same elements as described in the previous embodiments, and overlapping descriptions are omitted.

In the optical delay element 20 shown in FIG. 21A and FIG. 21B, the slab thickness of the line defect optical waveguide 8 is less than the slab thickness of the photonic crystal structure 3. Even with such a configuration, the waveguide band of the line defect optical waveguide 8 can be modified as described above, and it is possible to provide a photonic crystal line defect optical waveguide having small wavelength dispersion of the group refractive index ng.

The slab thickness of the line defect optical waveguide 8 may be set to be greater than the slab thickness of the photonic crystal structure 3. Such a configuration can also induce variation of the refractive index of the line defect optical waveguide 8.

In addition, although not illustrated, a material having a refractive index different from the refractive index of the photonic crystal structure 3 may be used for the line defect optical waveguide 8. Even with such a configuration, it is possible to modify the waveguide band of the line defect optical waveguide 8 as described above, and it is possible to provide a photonic crystal line defect optical waveguide having small wavelength dispersion of the group refractive index ng.

Further, although not illustrated, the line defect optical waveguide 8 may have a variable refractive index relative to the refractive index of the photonic crystal structure 3.

With the refractive index of the line defect optical waveguide 8 being variable, for example, through appropriate selection of materials, or by making use of a material's properties such as the electro-optical effect, the optical Kerr effect, or magneto-optical effect, a structure is obtainable which is equivalent to the line defect optical waveguide 8 having a reduced width, and the same effects can be obtained. Hence, it is possible to modify the waveguide band of the line defect optical waveguide 8 as described above, and it is possible to provide a photonic crystal line defect optical waveguide having small wavelength dispersion of the group refractive index ng.

In addition, it is also possible to obtain a variable refractive index of the line defect optical waveguide 8 and cause modification of the waveguide band of the line defect optical waveguide 8 as described above by making use of carrier plasma effect due to the semiconductor quantum well, or the non-linear effect, and the same effects as above can be obtained.

Seventh Embodiment

Figure 22:
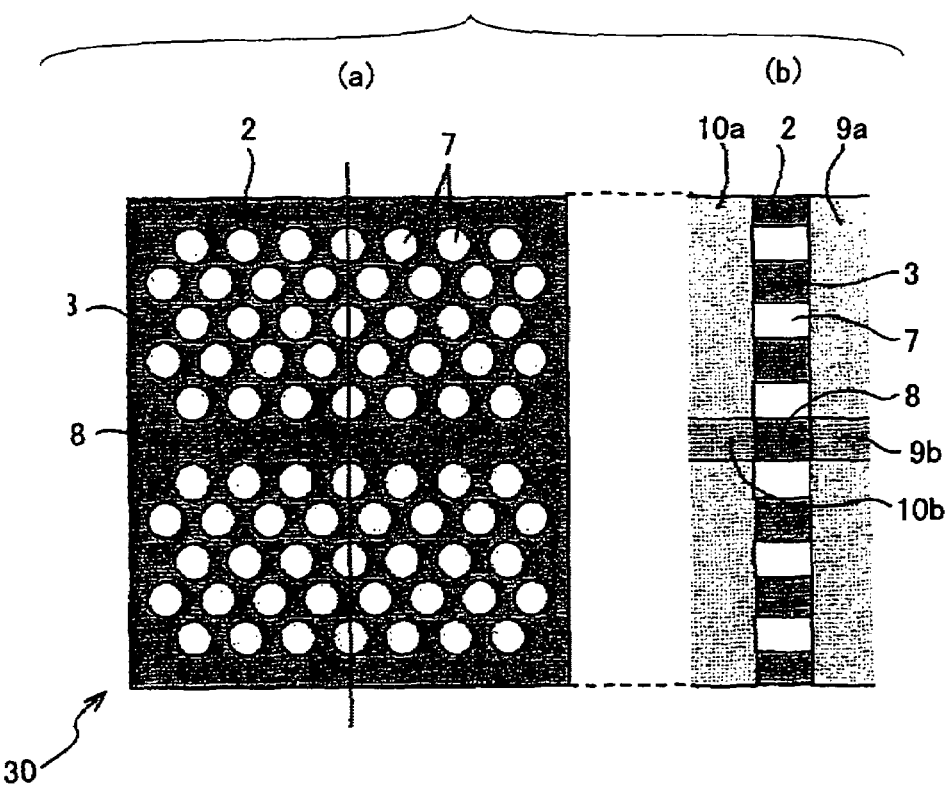
FIG. 22A and FIG. 22B are a plan view and a side view for schematically illustrating an optical delay element 30 according to a seventh embodiment of the present invention which includes a line defect optical waveguide 8 formed from a two-dimensional photonic crystal slab.

FIG. 22A and FIG. 22B are a plan view and a side view for schematically illustrating an optical delay element 30 according to a seventh embodiment of the present invention, which includes a line defect optical waveguide 8 formed from a two-dimensional photonic crystal slab. In the present embodiment, the same reference numbers are assigned to the same elements as described in the previous embodiments, and overlapping descriptions are omitted.

In the optical delay element 30 shown in FIG. 22A and FIG. 22B, a cladding 9a and a cladding 10a in the portion of the photonic crystal structure 3 have different refractive indexes from those of a cladding 9b and a cladding 10b in the portion of the line defect optical waveguide 8. For example, the refractive indexes of the cladding 9b and the cladding 10b may be higher or lower than the refractive indexes of the cladding 9a and the cladding 10a.

With such a configuration, the equivalent refractive index of the line defect optical waveguide 8 is varied, and a structure is obtainable which is equivalent to the line defect optical waveguide 8 having a reduced width. Hence, it is possible to modify the waveguide band of the line defect optical waveguide 8 as described above, and it is possible to provide a photonic crystal line defect optical waveguide having small wavelength dispersion of the group refractive index ng.

In the optical delay element 30 shown in FIG. 22A and FIG. 22B, it is illustrated that cladding portions having different refractive indexes are formed on the two sides of the thin film 2, but such cladding portions may be formed on one side of the thin film 2, for example, the upper side or lower side of the thin film 2.

Eighth Embodiment

In this embodiment, applications of optical delay elements of the present invention as described above are explained.

Using the optical delay elements of the present invention as described above, it is possible to construct a compact optical delay element, an optical pulse dispersion compensation element, and an optical pulse delay element able to actively control these elements by changing the refractive index. Therefore, this invention can be preferably applied to an optical routing device, an optical pulse synchronization device, an optical skew compensation device, or other optical devices.

Figure 23:
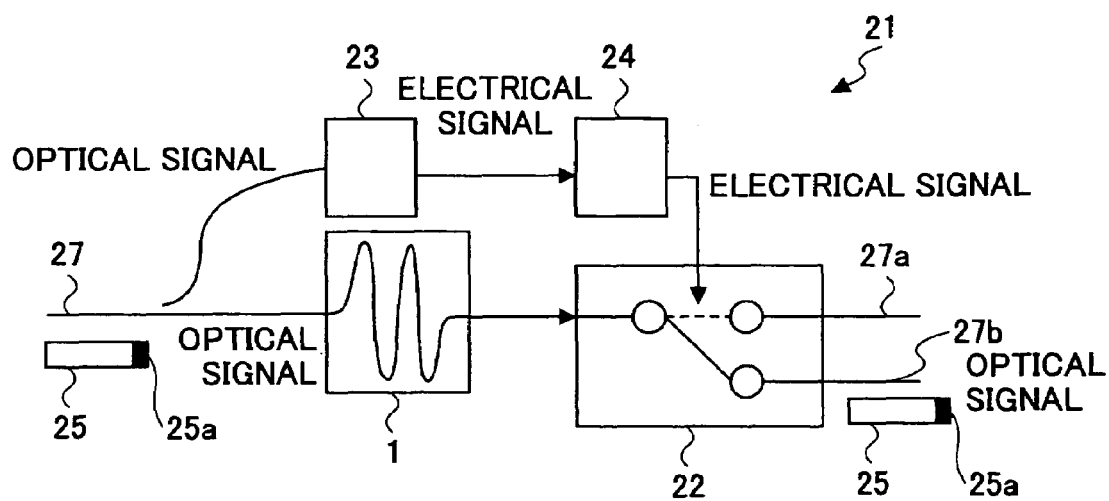
FIG. 23 is a block diagram of an optical routing device 21 according to an eighth embodiment of the present invention which uses an optical delay element of the present invention.

FIG. 23 is a block diagram of an optical routing device 21 according to an eighth embodiment of the present invention, which uses an optical delay element of the present invention, for example, the optical delay element 1 shown in FIG. 1.

As illustrated in FIG. 23, the optical routing device 21 includes the optical delay element 1 for delaying optical pulses, an optical switch element 22, a signal analyzing element 23 having an optical detector, a voltage application element 24, and input/output sections 27, 27a, and 27b.

The optical delay element 1, the optical switch element 22, the signal analyzing element 23, and the voltage application element 24 are connected by optical waveguides and electrical wires.

As illustrated in FIG. 23, optical signal packets 25 are divided by a not illustrated optical divider, and portions of the divided optical signals are input to the optical detector in the signal analyzing element 23, and a header 25a of input optical signals is detected by the optical detector. Then signal path information contained in the header 25a is analyzed, and commands are supplied to the voltage application element 24; thereby, the path of the optical switch element 22 is switched. During the sequence of electrical operations, in order to delay the information section of the optical signal packets 25, the optical signals are delayed by the optical delay element 1. Due to this, timing of the switching operation is aligned.

The optical switch element 22 is formed from a phase modulation optical switch or an intensity modulation optical switch. By arranging the photonic crystal structure 3 in the optical switch element 22, the optical switch element 22 can be formed as a photonic crystal element. Alternatively, the optical switch element 22 can be formed from an optical waveguide.

The optical routing device 21 includes input/output sections 27, 27a, and 27b for receiving signals from the outside and transmitting signals to the outside.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2004-086389 filed on Mar. 24, 2004, the entire contents of which are hereby incorporated by reference.

What is claimed is:

1. An optical delay element, comprising:
a line defect optical waveguide formed in a photonic crystal structure, the photonic crystal structure including,
a medium having a first refractive index, and
an array of hole portions filled with material having a second refractive index less than the first refractive index, the array of hole portions being arranged in the medium so as to have a center to center pitch along a straight line between adjacent hole portions of a distance "a," wherein
a width "D" of the line defect optical waveguide is greater than 0.7 times $3^{0.5}$("a") and less than 0.9 times $3^{0.5}$("a"), wherein
"D"=$3^{0.5}$("a") is the width of a common line defect optical waveguide formed from a single line defect photonic crystal, and wherein
a waveguide band of said line defect optical waveguide has a refractive index confinement mode and a photonic bandgap confinement mode, and the line defect optical waveguide guides light having a frequency higher than a frequency corresponding to the photonic bandgap confinement mode.

2. The optical delay element as claimed in claim 1, wherein
a waveguide band of the line defect optical waveguide has a first zero point and a second zero point in a third order dispersion curve of the line defect optical waveguide, a sign of the third order dispersion curve is inverted near the first zero point and the second zero point, the first zero point corresponds to a first frequency, and the second zero corresponds to a second frequency lower than the first frequency; and
the line defect optical waveguide guides light having a frequency near the first frequency or the second frequency and lower than the first frequency.

3. The optical delay element as claimed in claim 1, wherein a portion of the line defect optical waveguide has a varying refractive index.

4. The optical delay element as claimed in claim 3, wherein the refractive index of the line defect optical waveguide varies in response to electric field application.

5. The optical delay element as claimed in claim 3, wherein the refractive index of the line defect optical waveguide varies in response to light irradiation.

6. The optical delay element as claimed in claim 3, wherein the refractive index of the line defect optical waveguide varies in response to a temperature change.

7. The optical delay element as claimed in claim 1, wherein the line defect optical waveguide is a photonic crystal slab line defect optical waveguide formed by arranging a two-dimensional photonic crystal structure on a thin film having a thickness approximately equaling a wavelength of the light.

8. The optical delay element as claimed in claim 7, wherein the width of the line defect optical waveguide is varied by moving the photonic crystal structures on two sides of the line defect optical waveguide.

9. The optical delay element as claimed in claim 7, wherein a thickness of the photonic crystal slab line defect optical waveguide is different from a photonic crystal slab constituting the photonic crystal structure.

10. The optical delay element as claimed in claim 7, wherein a refractive index of the line defect optical waveguide is different from a refractive index of the photonic crystal structure portion.

11. The optical delay element as claimed in claim 7, wherein a portion of the line defect optical waveguide has a varying refractive index.

12. The optical delay element as claimed in claim 7, wherein each of an upper cladding portion and a lower cladding portion of the line defect optical waveguide has a refractive index greater than a refractive index of the photonic crystal structure portion.

13. The optical delay element as claimed in claim 7, wherein the two-dimensional photonic crystal structure is formed on a thin semiconductor substrate.

14. The optical delay element as claimed in claim 7, wherein the two-dimensional photonic crystal structure is formed on a SOI (silicon-on-insulator) substrate.

15. The optical delay element as claimed in claim 7, wherein the two-dimensional photonic crystal structure is formed on a thin substrate made of an electro-optical material.

16. The optical delay element as claimed in claim 7, wherein the two-dimensional photonic crystal structure is formed on a thin substrate made of a non-linear optical material.

17. The optical delay element as claimed in claim 7, wherein the two-dimensional photonic crystal structure is formed on a composite substrate made of a thin semiconductor film, a thin film made of an electro-optical material, or a non-linear optical material.

18. The optical delay element as claimed in claim 1, wherein the line defect optical waveguide is formed from an electro-optical material.

19. The optical delay element as claimed in claim 1, wherein the line defect optical waveguide is formed from a non-linear optical material.

* * * * *